(12) United States Patent
Alshina et al.

(10) Patent No.: US 9,262,804 B2
(45) Date of Patent: Feb. 16, 2016

(54) METHOD AND APPARATUS FOR PERFORMING INTERPOLATION BASED ON TRANSFORM AND INVERSE TRANSFORM

(71) Applicant: SAMSUNG ELECTRONICS CO., LTD., Suwon-si (KR)

(72) Inventors: Elena Alshina, Suwon-si (KR); Alexander Alshin, Suwon-si (KR); Nikolay Shlyakhov, Suwon-si (KR); Byeong-doo Choi, Siheung-si (KR); Yoon-mi Hong, Seoul (KR); Woo-jin Han, Suwon-si (KR); Tammy Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/218,494

(22) Filed: Mar. 18, 2014

(65) Prior Publication Data

US 2014/0198996 A1     Jul. 17, 2014

Related U.S. Application Data

(63) Continuation of application No. 13/080,319, filed on Apr. 5, 2011, now Pat. No. 8,676,000.

(60) Provisional application No. 61/367,498, filed on Jul. 26, 2010, provisional application No. 61/320,847, filed on Apr. 5, 2010.

(30) Foreign Application Priority Data

Oct. 1, 2010   (KR) .................. 10-2010-0095956

(51) Int. Cl.
    *G06K 9/32*       (2006.01)
    *G06T 3/40*       (2006.01)
(Continued)

(52) U.S. Cl.
    CPC .............. *G06T 3/4007* (2013.01); *H04N 7/014* (2013.01); *H04N 19/117* (2014.11);
(Continued)

(58) Field of Classification Search
    CPC ....................................................... G06T 3/40
    USPC ....................................................... 382/300
    See application file for complete search history.

(56) References Cited

U.S. PATENT DOCUMENTS 5,774,598 A    6/1998   Sunshine et al.
6,157,414 A    12/2000   Sakamoto
(Continued)

FOREIGN PATENT DOCUMENTS

CN       1531824 A      9/2004
CN       1722842 A      1/2006
(Continued)

OTHER PUBLICATIONS

Communication, Issued by the Australia Patent Office, Dated Mar. 20, 2015, In counterpart Australian Application No. 2011239142.
(Continued)

*Primary Examiner* — Gregory F Cunningham
(74) *Attorney, Agent, or Firm* — Sughrue Mion, PLLC

(57) ABSTRACT

Provided are a method and apparatus for interpolating an image. The method includes: selecting a first filter, from among a plurality of different filters, for interpolating between pixel values of integer pixel units, according to an interpolation location; and generating at least one pixel value of at least one fractional pixel unit by interpolating between the pixel values of the integer pixel units by using the selected first filter.

3 Claims, 34 Drawing Sheets

(51) Int. Cl.

| | | |
|---|---|---|
| H04N 19/48 | (2014.01) | |
| H04N 19/80 | (2014.01) | |
| H04N 19/523 | (2014.01) | |
| H04N 19/59 | (2014.01) | |
| H04N 19/117 | (2014.01) | |
| H04N 19/182 | (2014.01) | |
| H04N 7/01 | (2006.01) | |
| H04N 19/30 | (2014.01) | |

(52) U.S. Cl.
CPC ............ *H04N 19/182* (2014.11); *H04N 19/30* (2014.11); *H04N 19/48* (2014.11); *H04N 19/523* (2014.11); *H04N 19/59* (2014.11); *H04N 19/80* (2014.11)

(56) References Cited

U.S. PATENT DOCUMENTS

| | | | |
|---|---|---|---|
| 6,539,120 | B1 | 3/2003 | Sita et al. |
| 6,819,333 | B1 | 11/2004 | Sadowski |
| 6,950,469 | B2 | 9/2005 | Karczewicz et al. |
| 7,224,733 | B1 | 5/2007 | Benzler et al. |
| 7,512,179 | B2 | 3/2009 | Sanson et al. |
| 7,898,936 | B2 | 3/2011 | Al Adnani |
| 8,090,031 | B2 | 1/2012 | Wong et al. |
| 8,457,198 | B2 | 6/2013 | Baik |
| 8,611,416 | B2 | 12/2013 | Hwang et al. |
| 8,676,000 | B2 | 3/2014 | Alshina et al. |
| 8,737,481 | B2 | 5/2014 | Lee et al. |
| 9,118,913 | B2 | 8/2015 | Alshina et al. |
| 2002/0054241 | A1 | 5/2002 | Compton |
| 2003/0112864 | A1 | 6/2003 | Karczewicz et al. |
| 2004/0066854 | A1* | 4/2004 | Hannuksela ........... H04N 19/70 375/240.27 |
| 2004/0213470 | A1* | 10/2004 | Sato et al. ............... 382/239 |
| 2004/0233991 | A1* | 11/2004 | Sugimoto ............ H04N 19/139 375/240.16 |
| 2004/0257475 | A1 | 12/2004 | Kim et al. |
| 2005/0031211 | A1 | 2/2005 | Meur et al. |
| 2005/0110667 | A1* | 5/2005 | Borisavljevic ............... 341/152 |
| 2005/0114093 | A1 | 5/2005 | Cha et al. |
| 2005/0122347 | A1* | 6/2005 | Buerkle et al. ............... 345/660 |
| 2005/0281339 | A1 | 12/2005 | Song |
| 2006/0146935 | A1 | 7/2006 | Winger |
| 2006/0251330 | A1 | 11/2006 | Toth et al. |
| 2006/0285590 | A1 | 12/2006 | Guleryuz |
| 2007/0160129 | A1 | 7/2007 | Fujisawa et al. |
| 2008/0316912 | A1 | 12/2008 | Al Adnani |
| 2009/0067504 | A1 | 3/2009 | Zheludkov et al. |
| 2009/0092328 | A1 | 4/2009 | Wong et al. |
| 2009/0195535 | A1 | 8/2009 | Kanumuri et al. |
| 2009/0257493 | A1 | 10/2009 | Ye et al. |
| 2009/0257503 | A1 | 10/2009 | Ye et al. |
| 2009/0257668 | A1 | 10/2009 | Ye et al. |
| 2010/0296587 | A1 | 11/2010 | Rusanovskyy et al. |
| 2010/0322303 | A1 | 12/2010 | Wada et al. |
| 2012/0099658 | A1* | 4/2012 | Chen et al. ................ 375/240.25 |
| 2015/0172702 | A1* | 6/2015 | Wang ..................... H04N 19/80 375/240.17 |

FOREIGN PATENT DOCUMENTS

| | | |
|---|---|---|
| CN | 101009833 A | 8/2007 |
| CN | 101641960 A | 2/2010 |
| EP | 1 560 438 A1 | 8/2005 |
| EP | 2 048 886 A1 | 4/2009 |
| JP | 11-238121 A | 8/1999 |
| JP | 2002-152745 A | 5/2002 |
| JP | 2011-526770 A | 10/2011 |
| KR | 10-2005-0045746 A | 5/2005 |
| KR | 10-2006-0027795 A | 3/2006 |
| KR | 10-0842558 B1 | 6/2008 |
| KR | 10-2010-0040479 A | 4/2010 |
| RU | 2317654 C2 | 2/2008 |
| RU | 2523126 | 5/2014 |
| WO | 95/15538 A1 | 6/1995 |
| WO | 97/14252 A1 | 4/1997 |
| WO | 03/026296 A1 | 3/2003 |
| WO | 2007146574 A2 | 12/2007 |
| WO | 2009/044356 A2 | 4/2009 |
| WO | 2009093879 A2 | 7/2009 |
| WO | 2009110160 A1 | 9/2009 |
| WO | 2010/002214 A2 | 1/2010 |
| WO | 2011/126287 A3 | 10/2011 |

OTHER PUBLICATIONS

Communication, Issued by the State Intellectual Property Office of P.R. China, Dated Mar. 18, 2015, In counterpart Chinese Application No. 201180027840.1.

Communication, Issued by the Japan Patent Office, Dated Feb. 3, 2015, In counterpart Japanese Application No. 2013-503672.

Communication, Issued by the State Intellectual Property Office of P.R. China, Dated Apr. 3, 2015, In counterpart Chinese Application No. 201180027574.2.

Communication, dated Apr. 22, 2014, issued by the Russian Patent Office in counterpart Russian Application No. 2012146739/08(075102).

Communication, dated Apr. 30, 2014, issued by the Intellectual Property Corporation of Malaysia in counterpart Malaysian Application No. PI2012004433.

International Search Report (PCT/ISA/210) and Written Opinion (PCT/ISA/237) dated Dec. 9, 2011, issued in International Application No. PCT/KR2011/002385.

International Search Report (PCT/ISA/210) and Written Opinion (PCT/ISA/237) dated Dec. 7, 2011, issued in International Application No. PCT/KR2011/002388.

International Search Report (PCT/ISA/210) and Written Opinion (PCT/ISA/237) dated Nov. 23, 2011, issued in International Application No. PCT/KR2011/002382.

Communication dated Sep. 3, 2013 issued by the Australian Patent Office in counterpart Australian Application No. 2011239136.

Communication dated Sep. 18, 2013 issued by the Australian Patent Office in counterpart Australian Application No. 2011239142.

Communication dated Oct. 10, 2014 issued by the Canadian Intellectual Property Office in counterpart Canadian Patent Application No. 2,795,626.

Communication dated Nov. 4, 2014 issued by the Australian Government IP Australia in counterpart Australian Patent Application No. 2011239142.

Communication dated Oct. 16, 2014 issued by the Canadian Intellectual Property Office in counterpart Canadian Patent Application No. 2,795,620.

Shohei Matsuo et al.; "Improved Intra Angular Prediction by DCT-Based Interpolation Filter"; 20th European Signal Processing Conference (EUSIPCO 2012); Bucharest, Romania; Aug. 27-31, 2012; pp. 1568-1572.

Girod, B.; "Motion-Compensating Prediction with Fractional-Pel Accuracy"; IEEE Transactions on Communications; vol. 41; No. 4; Apr. 1993; pp. 604-612.

U-V Koc and K.J.R. Liu; "DCT-Based Motion Estimation: Technical Research Report"; Institute for Systems Research; University of Maryland; 1995; 34 pages total.

Communication dated Jun. 30, 2015 issued by the Indonesian Patent Office in counterpart Indonesian Patent Application No. W-00201204525.

Communication dated Jul. 24, 2015 issued by the European Patent Office in counterpart European Patent Application No. 11766138.9.

Shin et al; Adaptive Up-Sampling Method Using DCT for Spatial Scalability of Scalable Video Coding; IEEE Transactions on Circuits and Systems for Video Technology; vol. 19; No. 2; Feb. 1, 2009; XP011280563 pp. 206-214.

Kim et al; "Image Resizing in an Arbitrary Transform Domain"; IEICE Transactions on Communication; Communications Society; vol. E92-B; No. 1; Jan. 1, 2009; XP001523556 pp. 346-349.

(56) References Cited

OTHER PUBLICATIONS

Dugad et al; "A Fast Scheme for Downsampling and Upsampling in DCT Domain"; International Conference on Image Processing, 1999. ICIP 99. Proceedings. Oct. 24, 1999; vol. 2; XP010369046 pp. 909-913.

Merhav et al; "A Transform Domain Approach to Spatial Domain Image Scaling"; IEEE International Conference on Acoustics, Speech, and Signal Processing; vol. 4; May 1, 1996; XP000669702; pp. 2403-2406.

Prabhakar; "DCT scaling enables universal MPEG decoder" EDN Electrical Design News. (Texas Instrument), Reed Business Information; vol. 41; No. 12; Jun. 6, 1996; XP000622015; pp. 147-148, 150.

Communication dated Sep. 8, 2015 issued by the Japanese Patent Office in counterpart Japanese Patent Application No. 2013-503672.

Communication issued on Oct. 28, 2015 by The State Intellectual Property Office of PR China in related Application No. 201180027840.1.

Communication issued on Nov. 25, 2015 by The State Intellectual Property Office of PR China in related Application No. 201180027574.2.

Communication issued on Nov. 25, 2015 by The Russian Patent Office in related Application No. 2012146739/08(075102).

\* cited by examiner

CODING UNIT (810)

PREDICTION UNIT (860)

| α | SCALING FACTOR = $2^{13}$ |
|---|---|
| 1/4 | { 5924, -680, 277, -160, 111, -87, 76, -71,},<br>{ 3206, 6881, -1117, 548, -359, 274, -235, 220,},<br>{ -1500, 2769, 7152, -1316, 712, -506, 419, -388,},<br>{ 932, -1229, 2570, 7316, -1463, 856, -659, 597,},<br>{ -616, 734, -1066, 2423, 7460, -1617, 1034, -888,},<br>{ 398, -453, 586, -921, 2269, 7638, -1845, 1369,},<br>{ -225, 251, -309, 433, -743, 2041, 7973, -2457,},<br>{ 73, -81, 97, -131, 205, -408, 1429, 9810,}, |
| 1/2 | { 3511, -730, 334, -204, 147, -118, 105, -101,},<br>{ 6156, 4575, -1268, 684, -469, 370, -324, 311,},<br>{ -2312, 5619, 4925, -1533, 907, -674, 576, -547,},<br>{ 1378, -1962, 5354, 5148, -1738, 1113, -898, 840,},<br>{ -898, 1113, -1738, 5148, 5354, -1962, 1378, -1248,},<br>{ 576, -674, 907, -1533, 4925, 5619, -2312, 1916,},<br>{ -324, 370, -469, 684, -1268, 4575, 6156, -3376,},<br>{ 105, -118, 147, -204, 334, -730, 3511, 10397,}, |
| 3/4 | { 1429, -408, 205, -131, 97, -81, 73, -71,},<br>{ 7973, 2041, -743, 433, -309, 251, -225, 220,},<br>{ -1845, 7638, 2269, -921, 586, -453, 398, -388,},<br>{ 1034, -1617, 7460, 2423, -1066, 734, -616, 597,},<br>{ -659, 856, -1463, 7316, 2570, -1229, 932, -888,},<br>{ 419, -506, 712, -1316, 7152, 2769, -1500, 1369,},<br>{ -235, 274, -359, 548, -1117, 6881, 3206, -2457,},<br>{ 76, -87, 111, -160, 277, -680, 5924, 9810,}, |

FIG. 16A

| α | 2M = 4 (4-taps filter) (Scaling factor = 256) |
|---|---|
| −1/12 | { 13, 257, −19, 5,} |
| −1/16 | { 10, 256, −14, 4,} |
| 1/16 | { −8, 252, 16, −4,} |
| 1/12 | {−11, 250, 22, −5,} |
| 1/ 8 | {−15, 245, 34, −8,} |
| 1/6 | {−18, 238, 46, −10,} |
| 3/16 | {−20, 235, 53, −12,} |
| 1/4 | {−24, 223, 72, −15,} |
| 5/16 | {−26, 208, 93, −19,} |
| 1/3 | {−27, 203, 100, −20,} |
| 3/8 | {−27, 191, 114, −22,} |
| 5/12 | {−28, 181, 127, −24,} |
| 7/16 | {−27, 174, 134, −25,} |
| 1/2 | {−27, 155, 155, −27, |
| 9/16 | {−25, 134, 174, −27,} |
| 7/12 | {−24, 127, 181, −28,} |
| 5/8 | {−22, 114, 191, −27,} |
| 2/3 | {−20, 100, 203, −27,} |
| 11/16 | {−19, 93, 208, −26,} |
| 3/4 | {−15, 72, 223, −24, |
| 13/16 | {−12, 53, 235, −20,} |
| 5/6 | {−10, 46, 238, −18,} |
| 7/8 | {−8, 34, 245, −15,} |
| 11/12 | { −5, 22, 250, −11,} |
| 15/16 | { −4, 16, 252, −8,} |

FIG. 16B

| α | 2M = 6 (6-taps filter) (Scaling factor = 256) |
|---|---|
| −1/12 | { −4, 19, 254, −19, 8, −2,} |
| −1/16 | { −3, 14, 256, −15, 6, −2,} |
| 1/16 | { 3, −12, 252, 17, −6, 2,} |
| 1/12 | { 4, −16, 252, 22, −8, 2,} |
| 1/8 | { 5, −23, 248, 35, −13, 4,} |
| 1/6 | { 7, −28, 241, 48, −17, 5,} |
| 3/16 | { 8, −31, 239, 54, −19, 5,} |
| 1/4 | { 9, −37, 227, 75, −25, 7,} |
| 5/16 | { 11, −41, 212, 96, −31, 9,} |
| 1/3 | { 11, −42, 208, 103, −33, 9,} |
| 3/8 | { 11, −43, 197, 117, −36, 10,} |
| 5/12 | { 12, −46, 184, 132, −39, 11,} |
| 7/16 | { 12, −44, 178, 139, −40, 11,} |
| 1/2 | { 11, −43, 160, 160, −43, 11,} |
| 9/16 | { 11, −40, 139, 178, −44, 12,} |
| 7/12 | { 11, −39, 132, 184, −44, 12,} |
| 5/8 | { 10, −36, 117, 197, −43, 11,} |
| 2/3 | { 9, −33, 103, 208, −42, 11,} |
| 11/16 | { 9, −31, 96, 212, −41, 11} |
| 3/4 | { 7, −25, 75, 227, −37, 9,} |
| 13/16 | { 5, −19, 54, 239, −31, 8,} |
| 5/6 | { 5, −17, 48, 241, −28, 7,} |
| 7/8 | { 4, −13, 35, 248, −23, 5,} |
| 11/12 | { 2, −8, 22, 252, −16, 4,} |
| 15/16 | { 2, −6, 17, 252, −12, 3,} |

FIG. 16C

| α | 2M = 8 (8-taps filter) (Scaling factor = 256) |
|---|---|
| −1/12 | { 2, −8, 21, 254, −19, 9, −4, 1,} |
| −1/16 | { 2, −6, 15, 255, −15, 7, −3, 1,} |
| 1/16 | { −2, 5, −13, 254, 17, −7, 3, −1,} |
| 1/12 | { −2, 7, −18, 252, 23, −10, 5, −1,} |
| 1/8 | { −3, 10, −25, 248, 35, −14, 7, −2,} |
| 1/6 | { −4, 13, −31, 243, 48, −19, 9, −3,} |
| 3/16 | { −4, 14, −34, 240, 55, −22, 10, −3,} |
| 1/4 | { −5, 17, −41, 228, 76, −29, 14, −4,} |
| 5/16 | { −6, 20, −46, 215, 97, −35, 16, −5,} |
| 1/3 | { −6, 20, −47, 210, 104, −37, 17, −5,} |
| 3/8 | { −6, 21, −49, 199, 119, −41, 19, −6,} |
| 5/12 | { −6, 21, −49, 187, 133, −44, 20, −6,} |
| 7/16 | { −6, 22, −49, 180, 140, −45, 20, −6, |
| 1/2 | { −6, 21, −48, 161, 161, −48, 21, −6,} |
| 9/16 | { −6, 20, −45, 140, 180, −49, 22, −6,} |
| 7/12 | { −6, 20, −44, 133, 187, −49, 21, −6,} |
| 5/8 | { −6, 19, −41, 119, 199, −49, 21, −6,} |
| 2/3 | { −5, 17, −37, 104, 210, −47, 20, −6,} |
| 11/16 | { −5, 16, −35, 97, 215, −46, 20, −6,} |
| 3/4 | { −4, 14, −29, 76, 228, −41, 17, −5,} |
| 13/16 | { −3, 10, −22, 55, 240, −34, 14, −4,} |
| 5/6 | { −3, 9, −19, 48, 243, −31, 13, −4,} |
| 7/8 | { −2, 7, −14, 35, 248, −25, 10, −3,} |
| 11/12 | { −1, 5, −10, 23, 252, −18, 7, −2,} |
| 15/16 | { −1, 3, −7, 17, 254, −13, 5, −2,} |

FIG. 16D

| α | 2M = 10 (10-taps filter) (Scaling factor = 256) |
|---|---|
| -1/12 | { -1, 4, -9, 22, 253, -19, 9, -5, 3, -1,} |
| -1/16 | { -1, 3, -7, 16, 256, -15, 7, -4, 2, -1,} |
| 1/16 | { 1, -3, 6, -14, 254, 17, -8, 4, -2, 1,} |
| 1/12 | { 1, -4, 8, -18, 252, 23, -10, 6, -3, 1,} |
| 1/8 | { 2, -6, 12, -26, 249, 35, -15, 8, -4, 1,} |
| 1/6 | { 2, -7, 15, -33, 244, 48, -20, 11, -6, 2,} |
| 3/16 | { 3, -8, 17, -36, 241, 55, -23, 12, -7, 2,} |
| 1/4 | { 3, -10, 20, -43, 229, 76, -30, 16, -8, 3,} |
| 5/16 | { 4, -12, 23, -48, 215, 98, -37, 20, -10, 3,} |
| 1/3 | { 4, -12, 24, -49, 210, 105, -39, 21, -11, 3,} |
| 3/8 | { 4, -13, 25, -51, 200, 120, -43, 22, -12, 4,} |
| 5/12 | { 4, -13, 26, -52, 187, 134, -46, 24, -12, 4,} |
| 7/16 | { 4, -13, 26, -52, 182, 141, -47, 24, -13, 4,} |
| 1/2 | {4, -13, 26, -50, 161, 161, -50, 26, -13, 4,} |
| 9/16 | { 4, -13, 24, -47, 141, 182, -52, 26, -13, 4,} |
| 7/12 | { 4, -12, 24, -46, 134, 187, -52, 26, -13, 4,} |
| 5/8 | { 4, -12, 22, -43, 120, 200, -51, 25, -13, 4,} |
| 2/3 | { 3, -11, 21, -39, 105, 210, -49, 24, -12, 4,} |
| 11/16 | { 3, -10, 20, -37, 98, 215, -48, 23, -12, 4,} |
| 3/4 | {3, -8, 16, -30, 76, 229, -43, 20, -10, 3,} |
| 13/16 | { 2, -7, 12, -23, 55, 241, -36, 17, -8, 3,} |
| 5/6 | { 2, -6, 11, -20, 48, 244, -33, 15, -7, 2,} |
| 7/8 | { 1, -4, 8, -15, 35, 249, -26, 12, -6, 2,} |
| 11/12 | { 1, -3, 6, -10, 23, 252, -18, 8, -4, 1,} |
| 15/16 | { 1, -2, 4, -8, 17, 254, -14, 6, -3, 1,} |

FIG. 16E

| α | 2M = 12 (12-taps filter) (Scaling factor = 256) |
|---|---|
| -1/12 | { 1, -3, 5, -10, 22, 253, -19, 10, -6, 4, -2, 1,} |
| -1/16 | { 1, -2, 4, -7, 16, 254, -15, 7, -4, 3, -1, 0,} |
| 1/16 | { -1, 2, -4, 7, -14, 253, 17, -8, 5, -3, 2, 0,} |
| 1/12 | { -1, 3, -5, 9, -19, 253, 23, -10, 6, -4, 2, -1,} |
| 1/8 | { -1, 4, -7, 13, -26, 249, 35, -16, 9, -6, 3, -1,} |
| 1/6 | { -2, 5, -9, 16, -33, 243, 49, -21, 12, -7, 4, -1,} |
| 3/16 | { -2, 5, -10, 18, -36, 240, 55, -24, 14, -8, 5, -1,} |
| 1/4 | {-2, 7, -13, 22, -44, 230, 76, -31, 18, -11, 6, -2,} |
| 5/16 | { -2, 8, -15, 25, -49, 216, 98, -38, 21, -13, 7, -2,} |
| 1/3 | { -3, 8, -15, 26, -50, 211, 105, -40, 22, -13, 7, -2,} |
| 3/8 | { -3, 8, -16, 27, -52, 201, 121, -44, 24, -15, 8, -3,} |
| 5/12 | { -3, 9, -16, 28, -53, 188, 134, -47, 26, -15, 8, -3,} |
| 7/16 | { -3, 9, -16, 28, -53, 181, 141, -48, 27, -16, 9, -3,} |
| 1/2 | { -3, 9, -16, 28, -52, 162, 162, -52, 28, -16, 9, -3,} |
| 9/16 | { -3, 9, -16, 27, -48, 141, 181, -53, 28, -16, 9, -3,} |
| 7/12 | { -3, 8, -15, 26, -47, 134, 188, -53, 28, -16, 9, -3,} |
| 5/8 | { -3, 8, -15, 24, -44, 121, 201, -52, 27, -16, 8, -3,} |
| 2/3 | { -2, 7, -13, 22, -40, 105, 211, -50, 26, -15, 8, -3,} |
| 11/16 | { -2, 7, -13, 21, -38, 98, 216, -49, 25, -15, 8, -2,} |
| 3/4 | { -2, 6, -11, 18, -31, 76, 230, -44, 22, -13, 7, -2,} |
| 13/16 | { -1, 5, -8, 14, -24, 55, 240, -36, 18, -10, 5, -2,} |
| 5/6 | { -1, 4, -7, 12, -21, 49, 243, -33, 16, -9, 5, -2,} |
| 7/8 | { -1, 3, -6, 9, -16, 35, 249, -26, 13, -7, 4, -1,} |
| 11/12 | {-1, 2, -4, 6, -10, 23, 253, -19, 9, -5, 3, -1,} |
| 15/16 | { 0, 2, -3, 5, -8, 17, 253, -14, 7, -4, 2, -1,} |

FIG. 16F

| α | 2M = 14 (14-taps filter) (Scaling factor = 256) |
|---|---|
| -1/12 | { -1, 2, -4, 6, -10, 22, 254, -19, 10, -6, 4, -3, 1, 0, } |
| -1/16 | { 0, 1, -3, 4, -7, 16, 256, -15, 7, -5, 3, -2, 1, 0, } |
| 1/16 | {0, -1, 3, -4, 7, -14, 253, 17, -8, 5, -3, 2, -1, 0, } |
| 1/12 | {1, -2, 3, -5, 9, -19, 254, 23, -11, 6, -4, 3, -2, 0, } |
| 1/8 | { 1, -3, 5, -8, 13, -27, 249, 35, -16, 10, -6, 4, -2, 1, } |
| 1/6 | { 1, -3, 6, -10, 17, -34, 243, 49, -21, 13, -8, 5, -3, 1, } |
| 3/16 | { 1, -4, 7, -11, 19, -37, 241, 55, -24, 14, -9, 6, -3, 1, } |
| 1/4 | { 2, -5, 9, -14, 23, -45, 230, 76, -32, 19, -12, 8, -4, 1, } |
| 5/16 | { 2, -6, 10, -16, 26, -50, 217, 98, -39, 22, -14, 9, -5, 2, } |
| 1/3 | { 2, -6, 10, -17, 27, -51, 211, 105, -41, 24, -15, 10, -5, 2, } |
| 3/8 | { 2, -6, 11, -18, 28, -53, 201, 120, -45, 26, -16, 10, -6, 2, } |
| 5/12 | { 2, -6, 11, -18, 29, -54, 189, 134, -48, 27, -17, 11, -6, 2, } |
| 7/16 | { 2, -6, 11, -18, 29, -54, 183, 141, -49, 28, -18, 11, -6, 2, } |
| 1/2 | { 2, -6, 11, -18, 29, -52, 162, 162, -52, 29, -18, 11, -6, 2, } |
| 9/16 | { 2, -6, 11, -18, 28, -49, 141, 183, -54, 29, -18, 11, -6, 2, } |
| 7/12 | { 2, -6, 11, -17, 27, -48, 134, 189, -54, 29, -18, 11, -6, 2, } |
| 5/8 | { 2, -6, 10, -16, 26, -45, 120, 201, -53, 28, -18, 11, -6, 2, } |
| 2/3 | { 2, -5, 10, -15, 24, -41, 105, 211, -51, 27, -17, 10, -6, 2, } |
| 11/16 | { 2, -5, 9, -14, 22, -39, 98, 217, -50, 26, -16, 10, -6, 2, } |
| 3/4 | { 1, -4, 8, -12, 19, -32, 76, 230, -45, 23, -14, 9, -5, 2, } |
| 13/16 | { 1, -3, 6, -9, 14, -24, 55, 241, -37, 19, -11, 7, -4, 1, } |
| 5/6 | { 1, -3, 5, -8, 13, -21, 49, 243, -34, 17, -10, 6, -3, 1, } |
| 7/8 | { 1, -2, 4, -6, 10, -16, 35, 249, -27, 13, -8, 5, -3, 1, } |
| 11/12 | { 0, -2, 3, -4, 6, -11, 23, 254, -19, 9, -5, 3, -2, 1, } |
| 15/16 | { 0, -1, 2, -3, 5, -8, 17, 253, -14, 7, -4, 3, -1, 0, } |

FIG. 17A

| α | 2M = 6 (6-taps filter) (Scaling factor = 256) |
|---|---|
| 1/4 | { 8, -32, 224, 72, -24, 8 } (8 addings, 4 shift) |
| 1/2 | { 8, -40, 160, 160, -40, 8 } (6 addings, 3 shifts) |
| 3/4 | { 8, -24, 72, 224, -32, 8 } (8 addings, 4 shifts) |

FIG. 17B

| α | 2M = 12 (12-taps filter) (Scaling factor = 256) |
|---|---|
| 1/4 | {-1, 5, -12, 20, -40, 229, 76, -32, 16, -8, 4, -1 } (18 addings, 6 shifts) |
| 1/2 | {-1, 8, -16, 24, -48, 161, 161, -48, 24, -16, 8, -1 } (15 addings, 4 shifts) |
| 3/4 | {-1, 4, -8, 16, -32, 76, 229, -40, 20, -12, 5, -1 } (18 addings, 6 shifts) |

FIG. 17C

| α | 2M = 8 (8-taps filter) (Scaling factor = 256) |
|---|---|
| 1/4 | { -4, 16, -32, 228, 68, -28, 12, -4} |
| 1/2 | { -1, 9, -40, 160, 160, -40, 9, -1} |
| 3/4 | { -4, 12, -28, 68, 228, -32, 16, -4} |

FIG. 17D

| α | 2M = 8 (8-taps filter) (Scaling factor = 256) |
|---|---|
| 1/4 | { -4, 16, -40, 228, 76, -28, 12, -4} |
| 1/2 | { -4, 20, -48, 160, 160, -48, 20, -4} |
| 3/4 | { -4, 12, -28, 76, 228, -40, 16, -4} |

FIG. 17E

| α | 2M = 8 (8-taps filter) (Scaling factor = 256) |
|---|---|
| 1/4 | {-5, 17, -41, 228, 76, -29, 14, -4} |
| 1/2 | {-6, 21, -48, 161, 161, -48, 21, -6} |
| 3/4 | {-4, 14, -29, 76, 228, -41, 17, -5} |

FIG. 17F

| α | 2M = 8 (8-taps filter) (Scaling factor = 64) |
|---|---|
| 1/4 | {−1, 4, −10, 57, 19, −7, 3, −1} |
| 1/2 | {−1, 5, −12, 40, 40, −12, 5, −1} |
| 3/4 | {−1, 3, −7, 19, 57, −10, 4, −1} |

FIG. 17G

| α | 2M = 8 (8-taps filter) (Scaling factor = 64) |
|---|---|
| 1/4 | {−1, 4, −8, 57, 17, −7, 3, −1} |
| 1/2 | {−1, 5, −12, 40, 40, −12, 5, −1} |
| 3/4 | {−1, 3, −7, 17, 57, −8, 4, −1} |

FIG. 17H

| α | 2M = 6 (6-taps filter) (Scaling factor = 64) |
|---|---|
| 1/8 | {1, −6, 62, 9, −3, 1} |
| 2/8 | {2, −8, 56, 18, −6, 2} |
| 3/8 | {3, −10, 48, 30, −9, 2} |
| 4/8 | {2, −10, 40, 40, −10, 2} |
| 5/8 | {2, −9, 30, 48, −10, 3} |
| 6/8 | {2, −6, 18, 56, −8, 2} |
| 7/8 | {1, −3, 9, 62, −6, 1} |

FIG. 17I

| α | 2M = 6 (6-taps filter) (Scaling factor = 256) |
|---|---|
| 1/8 | {4, −24, 248, 36, −12, 4} |
| 2/8 | {8, −32, 224, 72, −24, 8} |
| 3/8 | {12, −40, 192, 120, −36, 8} |
| 4/8 | {8, −40, 160, 160, −40, 8} |
| 5/8 | {8, −36, 120, 192, −40, 12} |
| 6/8 | {8, −24, 72, 224, −32, 8} |
| 7/8 | {4, −12, 36, 248, −24, 4} |

FIG. 17J

| α | 2M = 4 (4-taps filter) (Scaling factor = 32) |
|---|---|
| 1/8 | { -2, 31, 4, -1 } |
| 2/8 | { -3, 28, 9, -2 } |
| 3/8 | { -3, 24, 14, -3 } |
| 4/8 | { -4, 20, 20, -4 } |
| 5/8 | { -3, 14, 24, -3 } |
| 6/8 | { -2, 9, 28, -3 } |
| 7/8 | { -1, 4, 31, -2 } |

FIG. 17K

| α | 2M = 4 (4-taps filter) (Scaling factor = 32) |
|---|---|
| 1/8 | { -2, 31, 4, -1 } |
| 2/8 | { -3, 28, 9, -2 } |
| 3/8 | { -4, 24, 14, -2 } |
| 4/8 | { -3, 19, 19, -3 } |
| 5/8 | { -2, 14, 24, -4 } |
| 6/8 | { -2, 9, 28, -3 } |
| 7/8 | { -1, 4, 31, -2 } |

FIG. 17L

| α | 2M = 4 (4-taps filter) (Scaling factor = 256) |
|---|---|
| 1/8 | { -16, 248, 32, -8 } |
| 2/8 | { -24, 224, 72, -16 } |
| 3/8 | { -24, 192, 112, -24 } |
| 4/8 | { -32, 160, 160, -32 } |
| 5/8 | { -24, 112, 192, -24 } |
| 6/8 | { -16, 72, 224, -24 } |
| 7/8 | { -8, 32, 248, -16 } |

FIG. 17M

| α | 2M = 4 (4-taps filter) (Scaling factor = 256) |
|---|---|
| 1/8 | { -16, 248, 32, -8 } |
| 2/8 | { -24, 224, 72, -16 } |
| 3/8 | { -32, 192, 112, -16 } |
| 4/8 | { -24, 152, 152, -24 } |
| 5/8 | { -16, 112, 192, -32 } |
| 6/8 | { -16, 72, 224, -24 } |
| 7/8 | { -8, 32, 248, -16 } |

FIG. 17N

| α | 2M = 4 (4-taps filter) (Scaling factor = 256) |
|---|---|
| 1/8 | { -14, 244, 34, -8 } |
| 2/8 | { -24, 224, 72, -16 } |
| 3/8 | { -28, 192, 114, -22 } |
| 4/8 | { -32, 160, 160, -32,} |
| 5/8 | { -22, 114, 192, -28 } |
| 6/8 | { -16, 72, 224, -24 } |
| 7/8 | { -8, 34, 244, -14 } |

FIG. 17O

| α | 2M = 6 (6-taps filter) (Scaling factor = 256) |
|---|---|
| 1/8 | { 5, -22, 247, 35, -13, 4 } |
| 2/8 | { 8, -32, 224, 72, -24, 8 } |
| 3/8 | { 11, -43, 196, 118, -36, 10 } |
| 4/8 | { 8, -40, 160, 160, -40, 8 } |
| 5/8 | { 10, -36, 118, 196, -43, 11 } |
| 6/8 | { 8, -24, 72, 224, -32, 8 } |
| 7/8 | { 4, -13, 35, 247, -22, 5 } |

FIG. 17P

| α | 2M = 8 (8-taps filter) (Scaling factor = 256) |
|---|---|
| 1/8 | { -3, 10, -25, 248, 36, -15, 7, -2 } |
| 2/8 | { -4, 16, -40, 228, 76, -28, 12, -4 } |
| 3/8 | { -6, 21, -48, 198, 119, -41, 19, -6 } |
| 4/8 | { -4, 20, -48, 160, 160, -48, 20, -4 } |
| 5/8 | { -6, 19, -41, 119, 198, -48, 21, -6 } |
| 6/8 | { -4, 12, -28, 76, 228, -40, 16, -4 } |
| 7/8 | { -2, 7, -15, 36, 248, -25, 10, -3 } |

FIG. 17Q

| α | 2M = 10 (10-taps filter) (Scaling factor = 256) |
|---|---|
| 1/8 | { 2, -6, 12, -26, 248, 36, -15, 9, -5, 1 } |
| 2/8 | { 4, -8, 20, -44, 228, 76, -32, 16, -8, 4 } |
| 3/8 | { 4, -13, 25, -51, 199, 120, -43, 23, -12, 4 } |
| 4/8 | { 4, -16, 28, -48, 160, 160, -48, 28, -16, 4 } |
| 5/8 | { 4, -12, 23, -43, 120, 199, -51, 25, -13, 4 } |
| 6/8 | { 4, -8, 16, -32, 76, 228, -44, 20, -8, 4 } |
| 7/8 | { 1, -5, 9, -15, 36, 248, -26, 12, -6, 2 } |

FIG. 17R

| α | 2M = 12 (12-taps filter) (Scaling factor = 256) |
|---|---|
| 1/8 | { -1, 4, -7, 13, -27, 249, 36, -16, 9, -6, 3, -1 } |
| 2/8 | { -1, 5, -12, 20, -40, 229, 76, -32, 16, -8, 4, -1 } |
| 3/8 | { -3, 9, -15, 27, -51, 200, 119, -44, 24, -14, 7, -3 } |
| 4/8 | { -1, 8, -16, 24, -48, 161, 161, -48, 24, -16, 8, -1 } |
| 5/8 | { -3, 7, -14, 24, -44, 119, 200, -51, 27, -15, 9, -3 } |
| 6/8 | { -1, 4, -8, 16, -32, 76, 229, -40, 20, -12, 5, -1 } |
| 7/8 | { -1, 3, -6, 9, -16, 36, 249, -27, 13, -7, 4, -1 } |

FIG. 17S

| α | 2M = 4 (4 taps filter) (Scaling factor 64) |
|---|---|
| 1/8 | { -3, 60, 8, -1,} || {-3, 61, 7,-1} |
| 2/8 | { -4, 54, 16, -2,}, |
| 3/8 | { -5, 46, 27, -4,},|| {-4, 46, 25, -3} || {-5, 46, 26, -3,} |
| 4/8 | { -4, 36, 36, -4,}, |
| 5/8 | { -4, 27, 46, -5,},|| {-3,25,46,-4} || {-3,26,46,-5} |
| 6/8 | { -2, 16, 54, -4,}, |
| 7/8 | { -1, 8, 60, -3,}, |

FIG. 17T

| α | 2M = 4 (4 taps filter) (Scaling factor 32) |
|---|---|
| 1/8 | {-1, 29, 5, -1,} || {-2, 29, 6, -2,} || {-2, 30, 4, 0} || {-2, 31, 4, -1,} |
| 2/8 | {-2, 27, 8, -1,} || {-3, 28, 9, -2,} |
| 3/8 | {-3, 23, 14, -2,} || {-2, 23, 13, -2,} || {-2, 22, 14, -2,} || {-2, 23, 12, -1} || {-4, 24, 14, -2,} || {-3, 24, 14, -3,} |
| 4/8 | {-2, 18, 18, -2,} || {-3, 19, 19, -3,} || {-4, 20, 20, -4,} |
| 5/8 | {-2, 14, 23, -3,} || {-2, 13, 23, -2,} || {-2, 14, 22, -2,} || {-1, 12, 23, -2} || {-2, 14, 24, -4,} || {-3, 14, 24, -3,} |
| 6/8 | {-1, 8, 27, -2,} || {-2, 9, 28, -3,} |
| 7/8 | {-1, 5, 29, -1,} || {-1, 6, 29, -2,} || {0, 4, 30, -2} || {-1, 4, 31, -2,} |

FIG. 17U

| α | 2M = 6 (6 taps filter) (Scaling factor 256) |
|---|---|
| 1/8 | { 1, -13, 241, 34, -8, 1, } || { 4, -24, 248, 36, -12, 4} |
| 2/8 | { 2, -22, 217, 72, -15, 2,} || { 8, -32, 224, 72, -24, 8} || {8, -35, 227, 73, -23, 6 } |
| 3/8 | { 3, -25, 185, 111, -21, 3,} || {12, -40, 192, 120, -36, 8} |
| 4/8 | { 3, -25, 150, 150, -25, 3,} || { 8, -40, 160, 160, -40, 8} || {5, -33, 156, 156, -33, 5 } |
| 5/8 | { 3, -21, 111, 185, -25, 3,} || { 8, -36, 120, 192, -40, 12} |
| 6/8 | { 2, -15, 72, 217, -22, 2,} || { 8, -24, 72, 224, -32, 8} || {6, -23, 73, 227, -35, 8} |
| 7/8 | { 1, -8, 34, 241, -13, 1, } || { 4, -12, 36, 248, -24, 4} |

FIG. 17V

| α | 2M = 6 (6 taps filter) (Scaling factor 64) |
|---|---|
| 1/8 | { 1, -6, 62, 9, -3, 1} |
| 2/8 | { 2, -8, 56, 18, -6, 2}||{ 2, -9, 57, 19, -7, 2}||{ 2, -9, 57, 18, -6, 2}||{2, -9,57,19,-6,1}||{2,-9,57,20,-7,1} |
| 3/8 | { 3, -10, 48, 30, -9, 2} |
| 4/8 | { 2, -10, 40, 40, -10, 2}||{1, -7,38,38,-7,1}||{1, -8,39,39,-8,1}||{} |
| 5/8 | { 2, -9, 30, 48, -10, 3} |
| 6/8 | { 2, -6, 18, 56, -8, 2}||{ 2, -7, 19, 57, -9, 2}||{ 2, -6, 18, 57, -9, 2}||{1, -6,19,57,-9,2}||{1, -7,20,57,-9,2} |
| 7/8 | { 1, -3, 9, 62, -6, 1} |

FIG. 17W

| α | 2M = 8 (8 taps filter) (Scaling factor 256) |
|---|---|
| 1/4 | {-4,16,-32,228,68,-28,12,-4}||{-4,16,-40,228,76,-28,12,-4}||{-4,15,-39,228,74,-26,11,-3}, |
| 1/2 | {-1,9,-40,160,160,-40,9,-1}||{-4,20,-48,160,160,-48,20,-4}||{-3,12,-40,159,159,-40,12,-3} |
| 3/4 | {-4,12,-28,68,228,-32,16,-4}||{-4,12,-28,76,228,-40,16,-4}||{-3,11,-26,74,228,-39,15,-4}, |

FIG. 17X

| α | 2M=8(8taps filter)(Scaling factor64) |
|---|---|
| 1/4 | {-1,4,-10,57,19,-7,3,-1}||{-1,4,-8,57,19,-7,3,-1}||{-1,3,-9,57,18,-6,2,0,}||{-1,2,-8,56,19,-6,2,0,}||{-1,3,-10,57, 19,-6,2,0,}||{-1,4,-9,57,18,-7,3,-1}||{-1,4,-11,57,20,-7,3,-1}, |
| 1/2 | {-1,4,-11,40,40,-11,4,-1}||{-1,5,-12,40,40,-12,5,-1}||{-1,3,-9,39,39,-9,3,-1,}||{-2,5,-12,41,42,-12,5,-2}||{-1,4, -10,39,39,-10,4,-1} |
| 3/4 | {-1,3,-7,19,57,-10,4,-1,}||{-1,3,-7,17,57,-8,4,-1}||{0,2,-6,18,57,-9,3,-1}||{0,2,-6,19,56,-8,2,-1,}||{0,2,-6,19,57, -10,3,-1,}||{-1,3,-7,18,57,-9,4,-1}||{-1,3,-7,20,57,-11,4,-1}, |

FIG. 17Y

| α | 2M=12(12taps filter)(Scaling factor256) |
|---|---|
| 1/4 | {-2,5,-9,18,-41,229,76,-30,16,-9,4,-1,} |
| 1/2 | {-1,4,-10,22,-48,161,161,-48,22,-10,4,-1} |
| 3/4 | {-1,4,-9,16,-30,76,229,-41,18,-9,5,-2} |

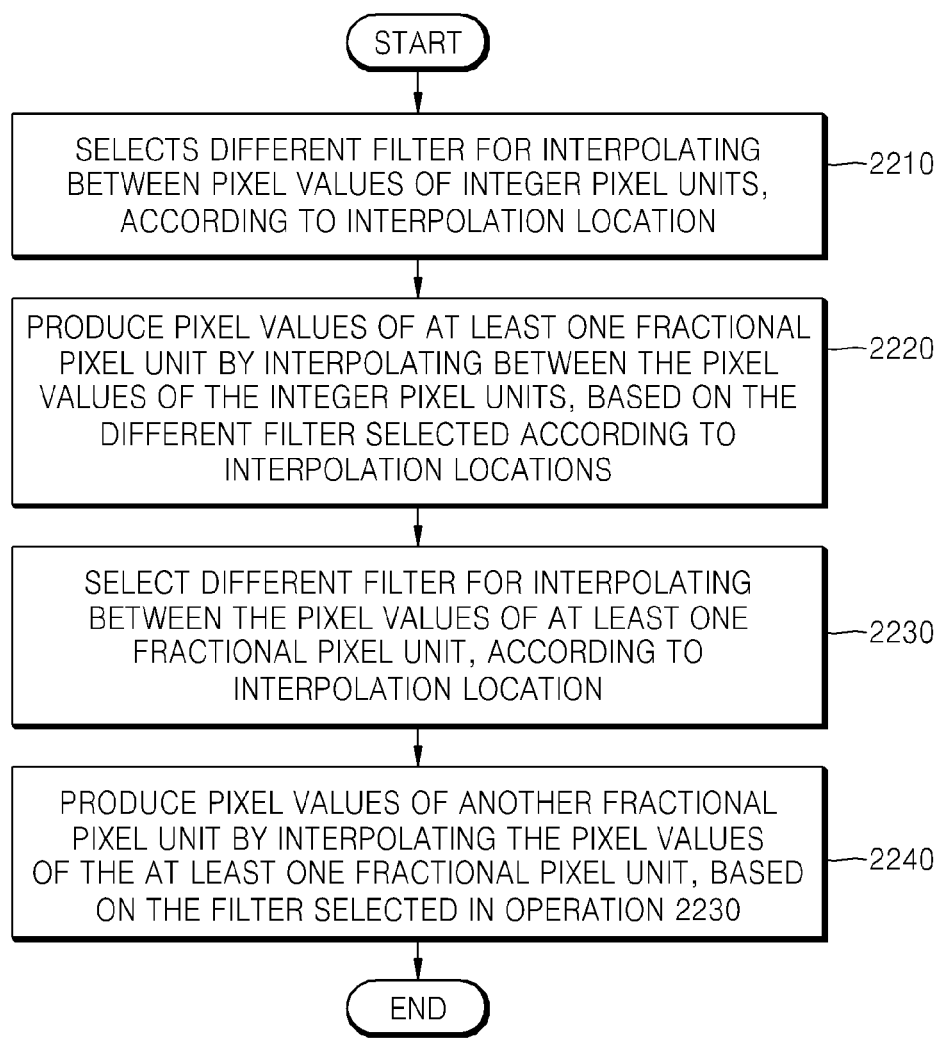

FIG. 23A

| α | 2M=12 (12-taps filter) (Scaling factor = 256) | | | | | | | | | | | |
|---|---|---|---|---|---|---|---|---|---|---|---|---|
| 1/8 | {−1.19, | 3.78, | −7.15, | 12.68, | −26.5, | 248.98, | 35.42, | −15.69, | 9.16, | −5.58, | 3.06, | −0.98 } |
| 1/4 | {−2.13, | 6.72, | −12.62, | 22.03, | −43.93, | 229.66, | 76.33, | −31.1, | 17.75, | −10.69, | 5.84, | −1.86 } |
| 3/8 | {−2.68, | 8.46, | −15.77, | 27.14, | −52.03, | 199.79, | 119.7, | −43.83, | 24.38, | −14.52, | 7.88, | −2.51 } |
| 1/2 | {−2.81, | 8.84, | −16.37, | 27.8, | −51.5, | 162.04, | 162.04, | −51.5, | 27.8, | −16.37, | 8.84, | −2.81 } |
| 5/8 | {−2.51, | 7.88, | −14.52, | 24.38, | −43.83, | 119.7, | 199.79, | −52.03, | 27.14, | −15.77, | 8.46, | −2.68 } |
| 3/4 | {−1.86, | 5.84, | −10.69, | 17.75, | −31.1, | 76.33, | 229.66, | −43.93, | 22.03, | −12.62, | 6.72, | −2.13 } |
| 7/8 | {−0.98, | 3.06, | −5.58, | 9.16, | −15.69, | 35.42, | 248.98, | −26.5, | 12.68, | −7.15, | 3.78, | −1.19 } |

FIG. 23B

| α | 2M=12 (12-taps filter) (Scaling factor = 256) | | | | | | | | | | | | SUM |
|---|---|---|---|---|---|---|---|---|---|---|---|---|---|
| 1/8 | {−1, | 4, | −7, | 13, | −27, | 249, | 35, | −16, | 9, | −6, | 3, | −1 } | 255 |
| 1/4 | {−2, | 7, | −13, | 22, | −44, | 230, | 76, | −31, | 18, | −11, | 6, | −2 } | 256 |
| 3/8 | {−3, | 8, | −16, | 27, | −52, | 200, | 120, | −44, | 24, | −15, | 8, | −3 } | 254 |
| 1/2 | {−3, | 9, | −16, | 28, | −52, | 162, | 162, | −52, | 28, | −16, | 9, | −3 } | 256 |
| 5/8 | {−3, | 8, | −15, | 24, | −44, | 120, | 200, | −52, | 27, | −16, | 8, | −3 } | 254 |
| 3/4 | {−2, | 6, | −11, | 18, | −31, | 76, | 230, | −44, | 22, | −13, | 7, | −2 } | 256 |
| 7/8 | {−1, | 3, | −6, | 9, | −16, | 35, | 249, | −27, | 13, | −7, | 4, | −1 } | 255 |

FIG. 23C

| α | 2M=12 (12-taps filter) (Scaling factor = 256) | SUM |
|---|---|---|
| 1/8 | {-1, 4, -7, 13, -27, 249, 36, -16, 9, -6, 3, -1} | 256 |
| 1/4 | {-2, 7, -13, 22, -44, 230, 76, -31, 18, -11, 6, -2} | 256 |
| 3/8 | {-3, 9, -15, 27, -51, 200, 119, -44, 24, -14, 7, -3} | 256 |
| 1/2 | {-3, 9, -16, 28, -52, 162, 162, -52, 28, -16, 9, -3} | 256 |
| 5/8 | {-3, 7, -14, 24, -44, 119, 200, -51, 27, -15, 9, -3} | 256 |
| 3/4 | {-2, 6, -11, 18, -31, 76, 230, -44, 22, -13, 7, -2} | 256 |
| 7/8 | {-1, 3, -6, 9, -16, 36, 249, -27, 13, -7, 4, -1} | 256 |

FIG. 23D

| α | 2M=8 (8-taps filter) (Scaling factor = 256) |
|---|---|
| 1/8 | {-2.86, 9.94, -24.9, 248.36, 35.14, -14.5, 6.96, -2.12} |
| 1/4 | {-5, 17.14, -42.12, 228.62, 75.72, -28.79, 13.52, -4.09} |
| 3/8 | {-6.19, 20.99, -48.53, 198.57, 118.76, -40.66, 18.65, -5.6} |
| 1/2 | {-6.37, 21.38, -47.89, 160.87, 160.87, -47.89, 21.38, -6.37} |
| 5/8 | {-5.6, 18.65, -40.66, 118.76, 198.57, -48.53, 20.99, -6.19} |
| 3/4 | {-4.09, 13.52, -28.79, 75.72, 228.62, -41.12, 17.14, -5} |
| 7/8 | {-2.12, 6.96, -14.5, 35.14, 248.36, -24.9, 9.94, -2.86} |

FIG. 23E

| α | 2M=8 (8-taps filter) (Scaling factor = 256) | SUM |
|---|---|---|
| 1/8 | { −3, 10, −25, 248, 36, −15, 7, −2 } | 256 |
| 1/4 | { −5, 17, −41, 228, 76, −29, 14, −4 } | 256 |
| 3/8 | { −6, 21, −48, 198, 119, −41, 19, −6 } | 256 |
| 1/2 | { −6, 21, −48, 161, 161, −48, 21, −6 } | 256 |
| 5/8 | { −6, 19, −41, 119, 198, −48, 21, −6 } | 256 |
| 3/4 | { −4, 14, −29, 76, 228, −41, 17, −5 } | 256 |
| 7/8 | { −2, 7, −15, 36, 248, −25, 10, −3 } | 256 |

METHOD AND APPARATUS FOR PERFORMING INTERPOLATION BASED ON TRANSFORM AND INVERSE TRANSFORM

CROSS-REFERENCE TO RELATED PATENT APPLICATIONS

This application is a Continuation of U.S. application Ser. No. 13/080,319, filed Apr. 5, 2011, which claims the benefit of U.S. Provisional Application No. 61/320,847, filed on Apr. 5, 2010, and U.S. Provisional Application No. 61/367,498, filed on Jul. 26, 2010, and claims priority from Korean Patent Application No. 10-2010-0095956, filed on Oct. 1, 2010 in the Korean Intellectual Property Office, the disclosures of which are incorporated herein in their entireties by reference.

BACKGROUND

1. Field

Apparatuses and methods consistent with exemplary embodiments relate to interpolating an image, and more particularly, to interpolating between pixel values of integer pixel units.

2. Description of the Related Art

In a related art image encoding and decoding method, one picture is divided into a plurality of macro blocks so as to encode an image. Then, each of the plurality of macro blocks is prediction-encoded by performing inter prediction or intra prediction thereon.

Inter prediction is a method of compressing an image by removing a temporal redundancy between pictures. A representative example of inter prediction is motion-estimation encoding. In motion-estimation encoding, each block of a current picture is predicted by using at least one reference picture. A reference block that is the most similar to a current block is searched for in a predetermined search range by using a predetermined evaluation function.

The current block is predicted based on the reference block, a residual block is obtained by subtracting a predicted block, which is the result of predicting, from the current block, and then the residual block is encoded. In this case, in order to precisely predict the current block, sub pixels that are smaller than integer pixel units are generated by performing interpolation in a search range of the reference picture, and inter prediction is performed based on the sub pixels.

SUMMARY

Aspects of one or more exemplary embodiments provide a method and apparatus for generating pixel values of fractional pixel units by interpolating pixel values of integer pixel units.

Aspects of one or more exemplary embodiments also provide a computer readable recording medium having recorded thereon a computer program for executing the method.

According to an aspect of an exemplary embodiment, there is provided a method of interpolating an image, the method including: selecting a first filter, from among a plurality of different filters, for interpolating between pixel values of integer pixel units, according to an interpolation location; and generating at least one pixel value of at least one fractional pixel unit by interpolating between the pixel values of the integer pixel units by using the selected first filter for interpolating between the pixel values of the integer pixel units.

The method may further include selecting a second filter, from among a plurality of different filters, for interpolating between the generated at least one pixel value of the at least one fractional pixel unit, according to an interpolation location; and interpolating between the generated at least one pixel value of the at least one fractional pixel unit by using the selected second filter for interpolating between the generated at least one pixel value of the at least one fractional pixel unit.

The first filter for interpolating between the pixel values of the integer pixel units may be a spatial-domain filter for transforming the pixel values of the integer pixel units by using a plurality of basis functions having different frequencies, and inverse transforming a plurality of coefficients, which are obtained by the transforming the pixel values of the integer pixel units, by using the plurality of basis functions, phases of which are shifted.

The second filter for interpolating between the generated at least one pixel value of the at least one fractional pixel unit may be a spatial-domain filter for transforming the generated at least one pixel value of the at least one fractional pixel unit by using a plurality of basis functions having different frequencies, and inverse transforming a plurality of coefficients, which are obtained by the transforming the generated at least one pixel value of the at least one fractional pixel unit, by using the plurality of basis functions, phases of which are shifted.

According to an aspect of another exemplary embodiment, there is provided an apparatus for interpolating an image, the apparatus including: a filter selector which selects a first filter, from among a plurality of different filters, for interpolating between pixel values of integer pixel units, according to an interpolation location; and an interpolator which generates at least one pixel value of at least one fractional pixel unit by interpolating between the pixel values of the integer pixel units by using the selected first filter for interpolating between the pixel values of the integer pixel units.

The filter selector may select a second filter, from among a plurality of different filters, for interpolating between the generated at least one pixel value of the at least one fractional pixel unit, according to an interpolation location, and the interpolator may interpolate between the generated at least one pixel value of the at least one fractional pixel unit by using the selected second filter for interpolating between the generated at least one pixel value of the at least one fractional pixel unit.

According to an aspect of another exemplary embodiment, there is provided a computer readable recording medium having embodied thereon a computer program for executing the method described above.

According to an aspect of another exemplary embodiment, there is provided a method of interpolating an image, the method including: transforming pixel values in a spatial domain by using a plurality of basis functions having different frequencies; shifting phases of the plurality of basis functions; and inverse transforming a plurality of coefficients, obtained by the transforming the pixel values, by using the phase-shifted plurality of basis functions.

BRIEF DESCRIPTION OF THE DRAWINGS

The above and other features will become more apparent by describing in detail exemplary embodiments with reference to the attached drawings in which:

FIGS. 16A to 16F illustrate 1D interpolation filters according to exemplary embodiments;

FIGS. 17A to 17Y illustrate optimized 1D interpolation filters according to exemplary embodiments;

FIG. 22 is a flowchart illustrating an image interpolation method according to another exemplary embodiment; and FIGS. 23A to 23E illustrate methods of performing scaling and rounding off in relation to a 1D interpolation filter, according to exemplary embodiments.

DETAILED DESCRIPTION OF EXEMPLARY EMBODIMENTS

Hereinafter, one or more exemplary embodiments will be described more fully with reference to the accompanying drawings. Expressions such as "at least one of," when preceding a list of elements, modify the entire list of elements but do not modify the individual elements of the list. In the present specification, an "image" may denote a still image for a video or a moving image, that is, the video itself.

Figure 1:
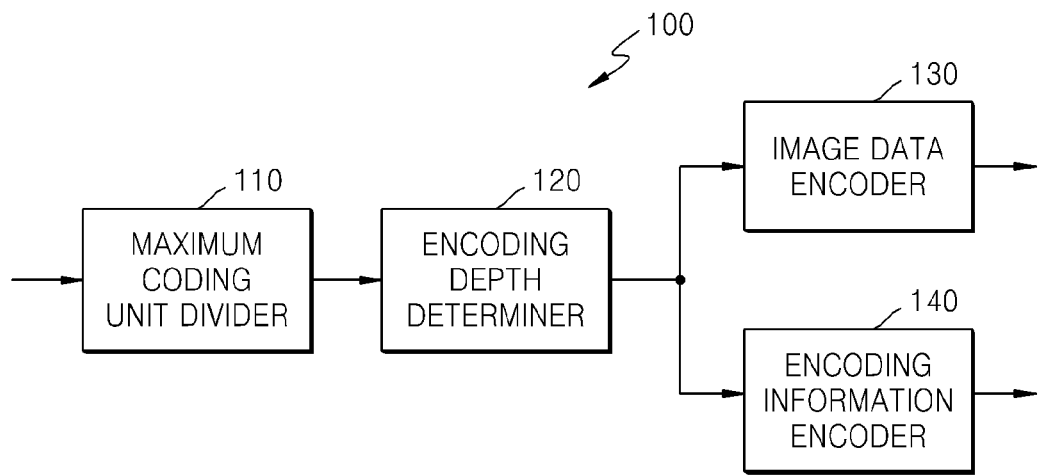
FIG. 1 is a block diagram of an apparatus for encoding an image according to an exemplary embodiment.

FIG. 1 is a block diagram of an apparatus 100 for encoding an image, according to an exemplary embodiment. Referring to FIG. 1, the apparatus 100 for encoding an image includes a maximum coding unit divider 110, an encoding depth determiner 120, an image data encoder 130, and an encoding information encoder 140.

The maximum coding unit divider 110 may divide a current frame or slice based on a maximum coding unit that is a coding unit of the largest size. That is, the maximum coding unit divider 110 may divide the current frame or slice into at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a $k^{th}$ depth may include a plurality of sub coding units of a $(k+n)^{th}$ depth (where k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ration may increase. However, when a complex area such as people or buildings is encoded, the smaller a coding unit is, the more a compression ration may increase.

Accordingly, according to an exemplary embodiment, a different maximum image coding unit and a different maximum depth may be set for each frame or slice. Since a maximum depth denotes the maximum number of times by which a coding unit may decrease, the size of each minimum coding unit included in a maximum image coding unit may be variably set according to a maximum depth. The maximum depth may be determined differently for each frame or slice or for each maximum coding unit.

The encoding depth determiner 120 determines a division shape of the maximum coding unit. The division shape may be determined based on calculation of rate-distortion (RD) costs. The determined division shape of the maximum coding unit is provided to the encoding information encoder 140, and image data according to maximum coding units is provided to the image data encoder 130.

A maximum coding unit may be divided into sub coding units having different sizes according to different depths, and the sub coding units having different sizes, which are included in the maximum coding unit, may be predicted or transformed based on processing units having different sizes. In other words, the apparatus 100 for encoding an image may perform a plurality of processing operations for image encoding based on processing units having various sizes and various shapes. To encode image data, processing operations, such as at least one of prediction, transform, and entropy encoding, are performed, wherein processing units having the same size or different sizes may be used for the processing operations, respectively.

For example, the apparatus 100 for encoding an image may select a processing unit that is different from a coding unit to predict the coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of the height and width of a coding unit is equally divided by two. Hereinafter, a processing unit, which is the base of prediction, is defined as a 'prediction unit'.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

Alternatively, the apparatus 100 for encoding an image may perform transform on image data, based on a processing unit having a different size from a coding unit. For the transform in the coding unit, the transform may be performed based on a processing unit having a size equal to or smaller than that of the coding unit. Hereinafter, a processing unit, which is the base of transform, is defined as a 'transform unit'. The transform may be discrete cosine transform (DCT) or Karhunen Loeve transform (KLT) or any other fixed point spatial transform.

The encoding depth determiner 120 may determine sub coding units included in a maximum coding unit by using RD optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transform unit of the sub coding unit.

The information about the division shape of the maximum coding unit may be information, e.g., flag information, indicating whether each coding unit is divided. For example, when the maximum coding unit is divided and encoded, information indicating whether the maximum coding unit is divided is encoded. Also, when a sub coding unit divided from the maximum coding unit is divided and encoded, information indicating whether the sub coding unit is divided is encoded.

Since sub coding units having different sizes exist for each maximum coding unit and information about an encoding mode must be determined for each sub coding unit, information about at least one encoding mode may be determined for one maximum coding unit.

The apparatus 100 for encoding an image may generate sub coding units by equally dividing both the height and width of a maximum coding unit by two according to an increase of depth. That is, when the size of a coding unit of a $k^{th}$ depth is 2N×2N, the size of a coding unit of a $(k+1)^{th}$ depth is N×N.

Accordingly, the apparatus 100 for encoding an image may determine an optimal division shape for each maximum coding unit, based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
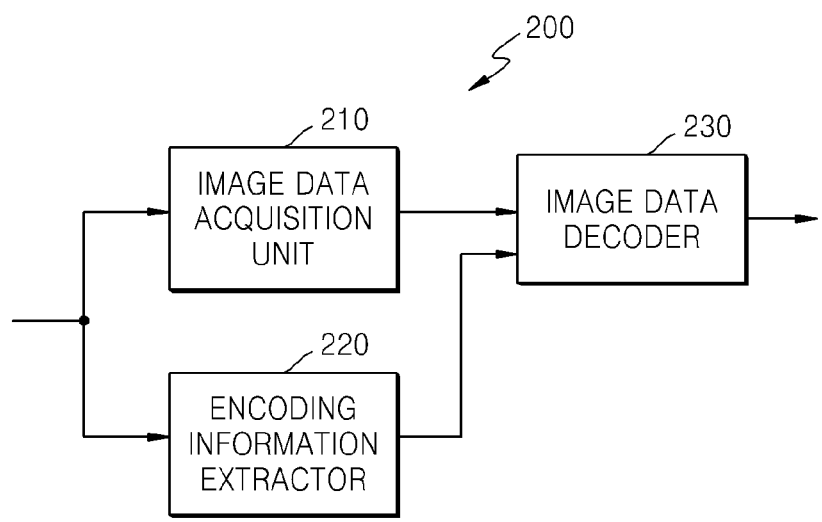
FIG. 2 is a block diagram of an apparatus for decoding an image according to an exemplary embodiment.

FIG. 2 is a block diagram of an apparatus 200 for decoding an image according to an exemplary embodiment. Referring to FIG. 2, the apparatus 200 for decoding an image includes an image data acquisition unit 210, an encoding information extractor 220, and an image data decoder 230.

The image data acquisition unit 210 acquires image data according to maximum coding units by parsing a bitstream received by the apparatus 200 for decoding an image, and outputs the image data to the image data decoder 230. The image data acquisition unit 210 may extract information about maximum coding units of a current frame or slice from a header of the current frame or slice. In other words, the image data acquisition unit 210 divides the bitstream according to the maximum coding units so that the image data decoder 230 may decode the image data according to the maximum coding units.

The encoding information extractor 220 extracts information about a maximum coding unit, a maximum depth, a division shape of the maximum coding unit, and an encoding mode of sub coding units from the header of the current frame by parsing the bitstream received by the apparatus 200 for decoding an image. The information about the division shape and the information about the encoding mode are provided to the image data decoder 230.

The information about the division shape of the maximum coding unit may include information about sub coding units having different sizes according to depths and included in the maximum coding unit, and may be information (e.g., flag information) indicating whether each coding unit is divided. The information about the encoding mode may include information about a prediction unit according to sub coding units, information about a prediction mode, and information about a transform unit.

The image data decoder 230 restores the current frame by decoding image data of each maximum coding unit, based on the information extracted by the encoding information extractor 220.

The image data decoder 230 may decode the sub coding units included in a maximum coding unit, based on the information about the division shape of the maximum coding unit. The decoding may include intra prediction, inter prediction that includes motion compensation, and inverse transform.

The image data decoder 230 may perform intra prediction or inter prediction based on information about a prediction unit and information about a prediction mode in order to predict a prediction unit. The image data decoder 230 may also perform inverse transform for each sub coding unit based on information about a transform unit of a sub coding unit.

Figure 3:
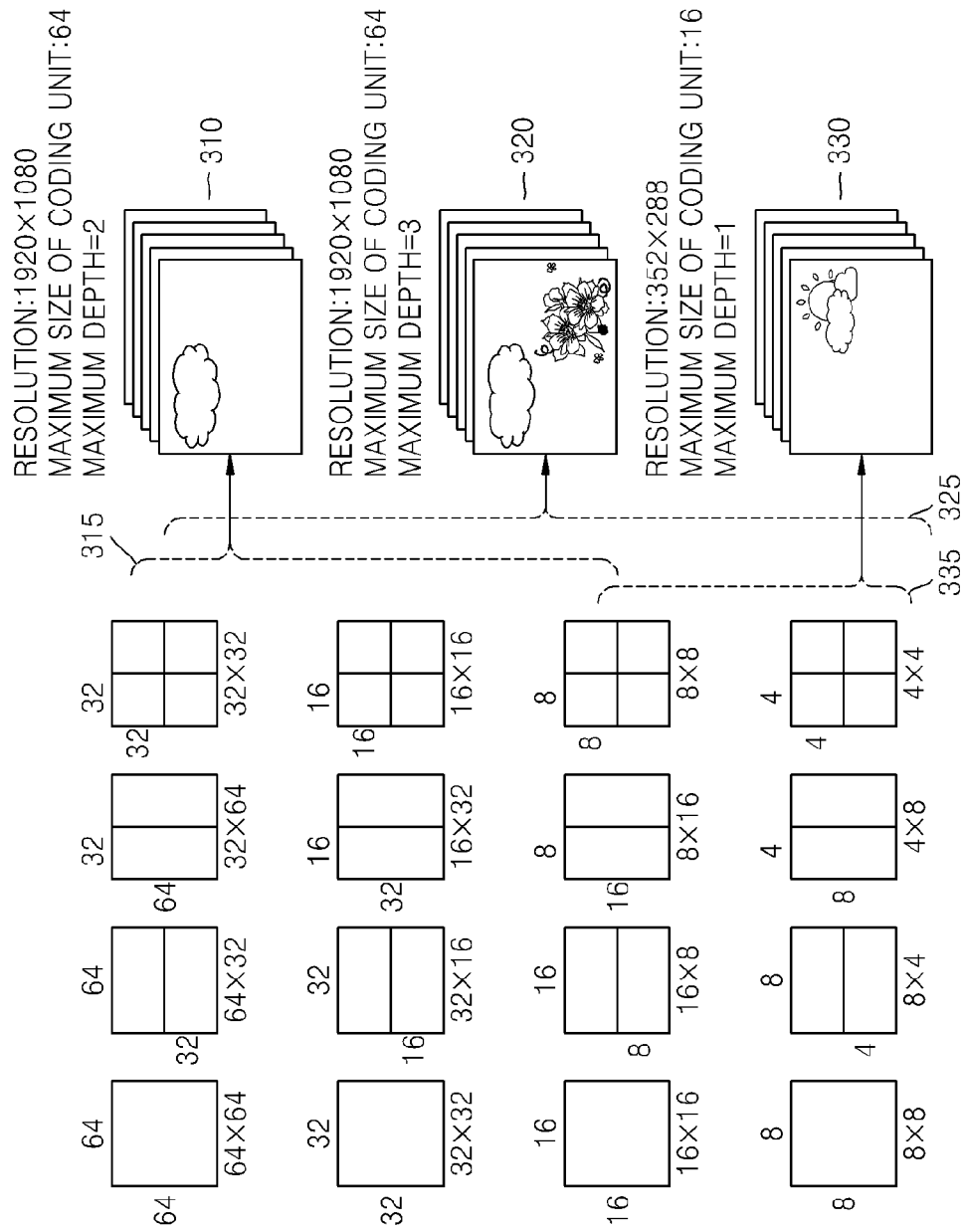
FIG. 3 illustrates hierarchical coding units according to an exemplary embodiment.

FIG. 3 illustrates hierarchical coding units according to an exemplary embodiment. Referring to FIG. 3, the hierarchical coding units may include coding units whose widths and heights are 64×64, 32×32, 16×16, 8×8, and 4×4. Besides these coding units having perfect square shapes, coding units whose width and heights are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 1.

When the resolution is high or the amount of data is great, a maximum size of a coding unit may be relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase of a depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase of a depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, the current exemplary embodiment is suitable for encoding an image including more minute scenes.

Figure 4:
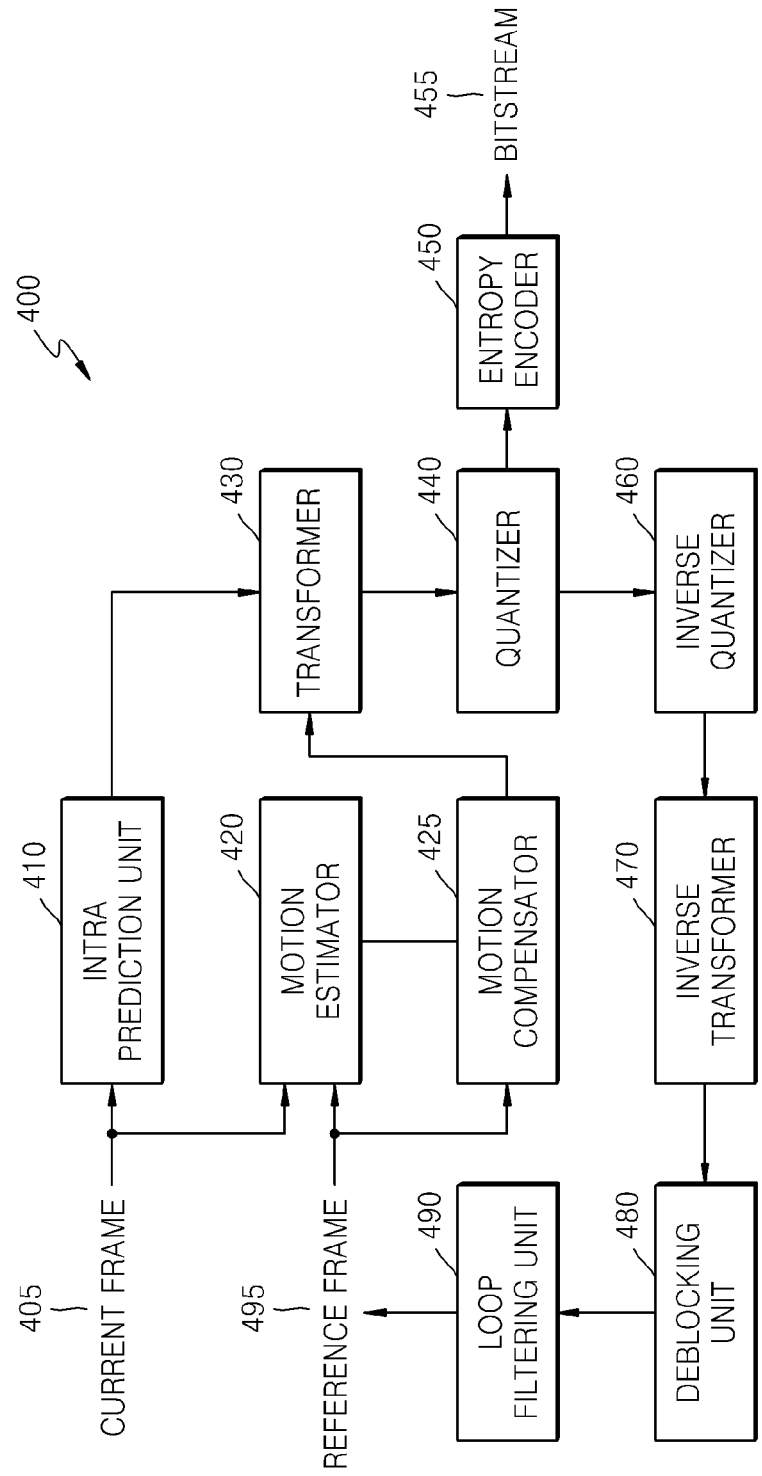
FIG. 4 is a block diagram of an image encoder based on a coding unit, according to an exemplary embodiment.

FIG. 4 is a block diagram of an image encoder 400 based on a coding unit, according to an exemplary embodiment. An intra prediction unit 410 performs intra prediction on prediction units of the intra mode in a current frame 405, and a motion estimator 420 and a motion compensator 425 perform inter prediction and motion compensation on prediction units of the inter mode by using the current frame 405 and a reference frame 495.

Residual values are generated based on the prediction units output from the intra prediction unit 410, the motion estimator 420, and the motion compensator 425, and are then output as quantized transform coefficients by passing through a transformer 430 and a quantizer 440.

The quantized transform coefficients are restored to the residual values by passing through an inverse quantizer 460 and an inverse transformer 470, are post-processed by passing through a deblocking unit 480 and a loop filtering unit 490, and are then output as the reference frame 495. The quantized transform coefficients may be output as a bitstream 455 by passing through an entropy encoder 450.

To perform encoding based on an encoding method according to an exemplary embodiment, components of the image encoder 400, i.e., the intra prediction unit 410, the motion estimator 420, the motion compensator 425, the transformer 430, the quantizer 440, the entropy encoder 450, the inverse quantizer 460, the inverse transformer 470, the deblocking unit 480, and the loop filtering unit 490, may perform image encoding processes, based on a maximum coding unit, sub coding units according to depths, a prediction unit, and a transform unit.

Figure 5:
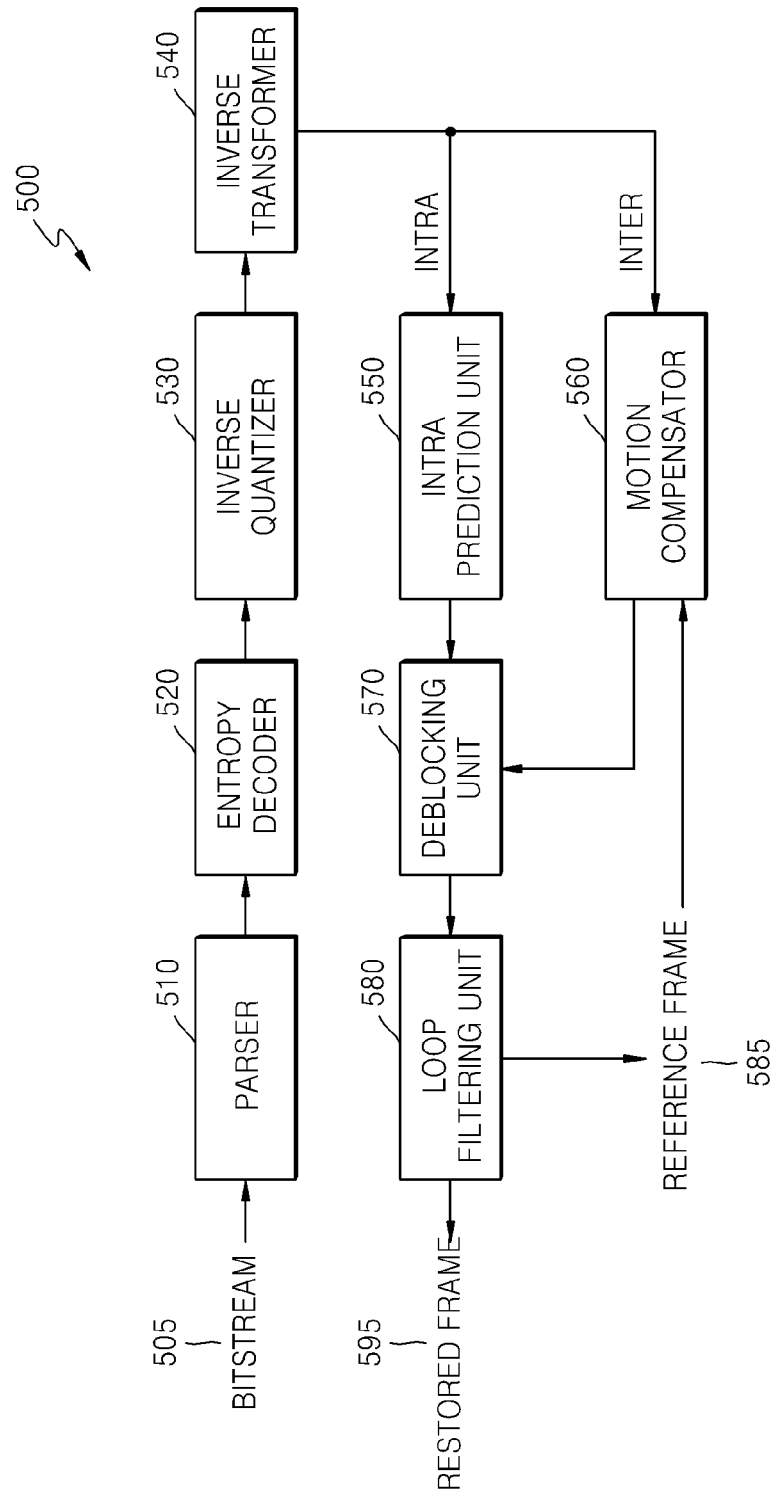
FIG. 5 is a block diagram of an image decoder based on a coding unit, according to an exemplary embodiment.

FIG. 5 is a block diagram of an image decoder 500 based on a coding unit, according to an exemplary embodiment. Referring to FIG. 5, a bitstream 505 is parsed by a parser 510 in order to obtain encoded image data to be decoded and encoding information which is necessary for decoding. The encoded image data is output as inverse-quantized data by passing through an entropy decoder 520 and an inverse quantizer 530, and is restored to residual values by passing through an inverse transformer 540. The residual values are restored according to coding units by being added to an intra prediction result of an intra prediction unit 550 or a motion compensation result of a motion compensator 560. The restored coding units are used for prediction of next coding units or a next frame by passing through a deblocking unit 570 and a loop filtering unit 580.

To perform decoding based on a decoding method according to an exemplary embodiment, components of the image decoder 500, i.e., the parser 510, the entropy decoder 520, the inverse quantizer 530, the inverse transformer 540, the intra prediction unit 550, the motion compensator 560, the deblocking unit 570, and the loop filtering unit 580, may perform image decoding processes based on a maximum coding unit, sub coding units according to depths, a prediction unit, and a transform unit.

In particular, the intra prediction unit 550 and the motion compensator 560 determine a prediction unit and a prediction mode in a sub coding unit by considering a maximum coding unit and a depth, and the inverse transformer 540 performs inverse transform by considering the size of a transform unit.

Figure 6:
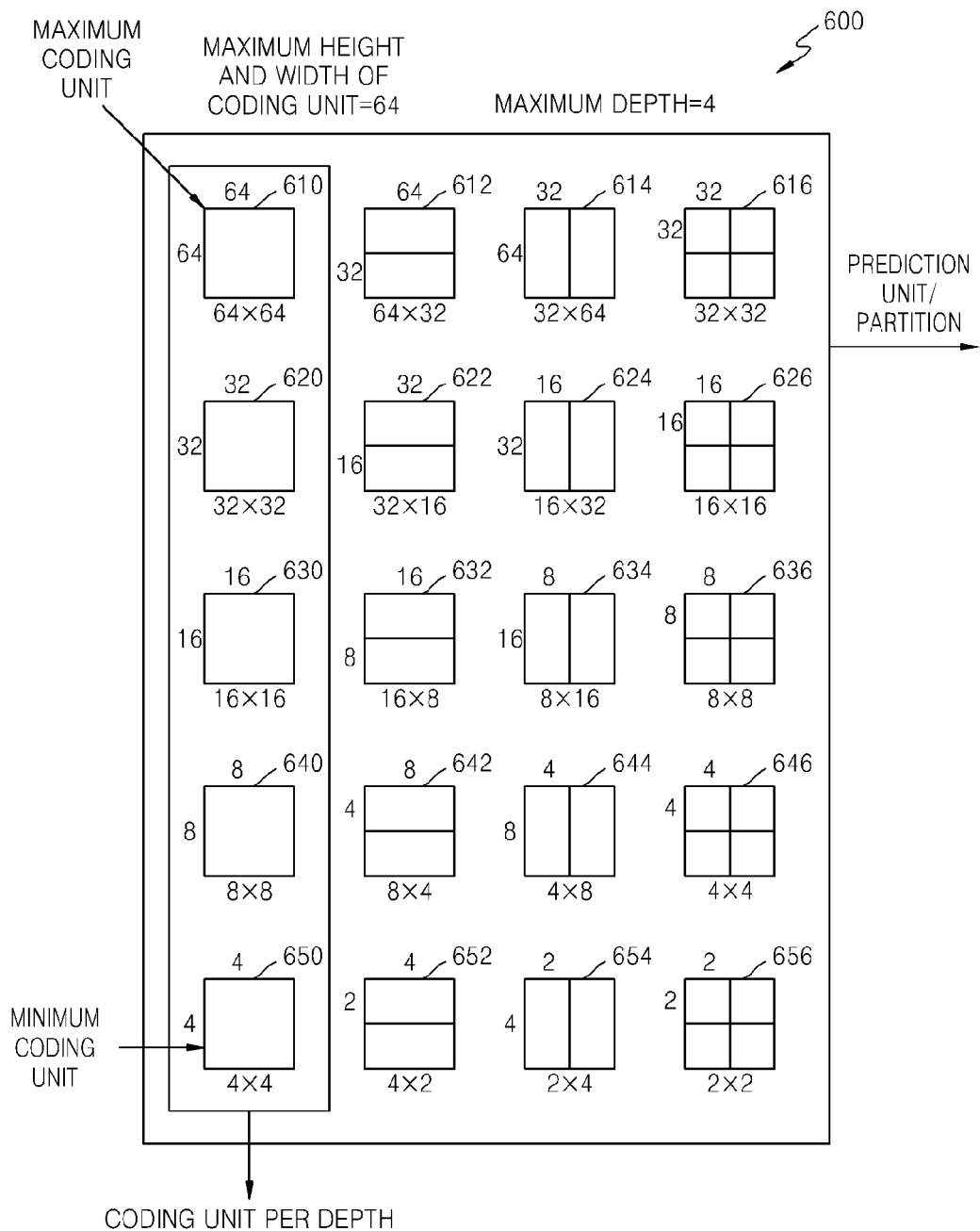
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment. The apparatus 100 for encoding an image illustrated in FIG. 1 and the apparatus 200 for decoding an image illustrated in FIG. 2 use hierarchical coding units to perform encoding and decoding in consideration of image characteristics. A maximum coding unit and a maximum depth may be adaptively set according to the image characteristics or variously set according to requirements of a user.

In FIG. 6, a hierarchical coding unit structure 600 has a maximum coding unit 610 whose height and width are 64 and maximum depth is 4. A depth increases along a vertical axis of the hierarchical coding unit structure 600, and as a depth increases, the heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

Finally, the coding unit 650 whose depth is 4 and size is 4×4 is a minimum coding unit and a coding unit of a maximum depth, and a prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
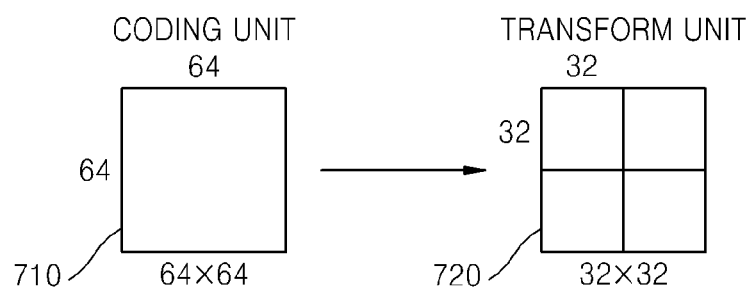
FIG. 7 illustrates a coding unit and a transform unit, according to an exemplary embodiment.

FIG. 7 illustrates a coding unit and a transform unit, according to an exemplary embodiment. The apparatus 100 for encoding an image illustrated in FIG. 1 and the apparatus 200 for decoding an image illustrated in FIG. 2 perform encoding and decoding with a maximum coding unit itself or with sub coding units, which are equal to or smaller than the maximum coding unit, divided from the maximum coding unit. In the encoding and decoding process, the size of a transform unit for transform may be selected to be no larger than that of a corresponding coding unit. For example, referring to FIG. 7, when a current coding unit 710 has the size of 64×64, transform may be performed using a transform unit 720 having the size of 32×32.

Figure 8A:
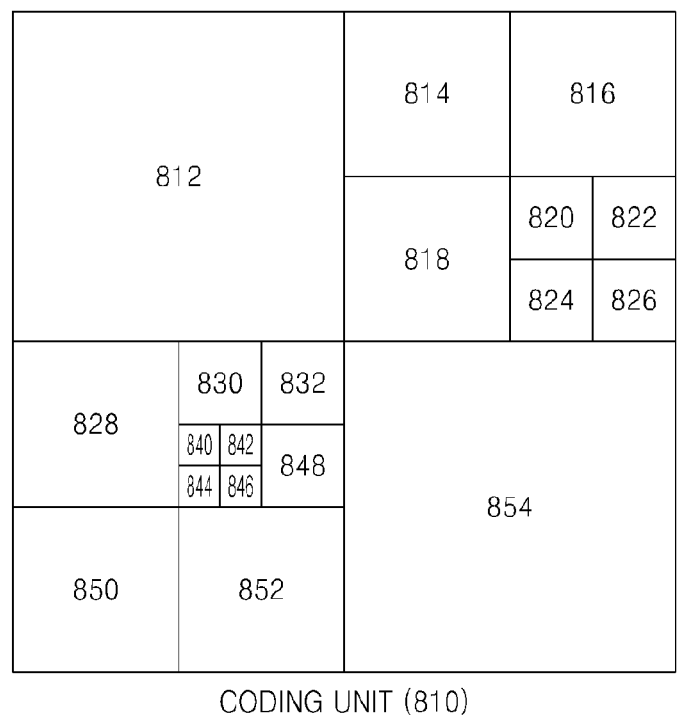
FIGS. 8A to 8D illustrate division shapes of a coding unit, a prediction unit, and a transform unit, according to an exemplary embodiment.
Figure 8B:
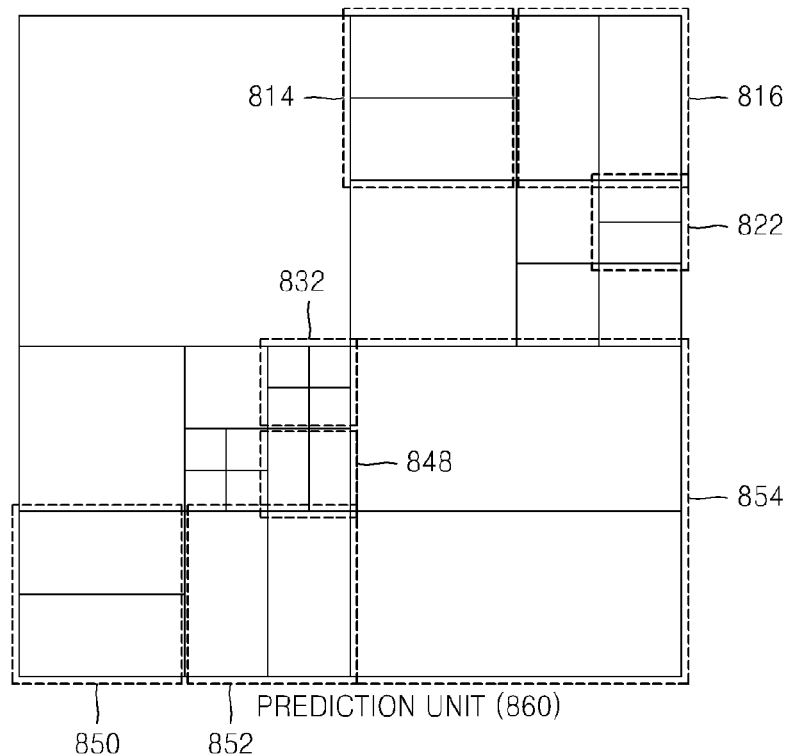

FIGS. 8A through 8D illustrate division shapes of a coding unit, a prediction unit, and a transform unit, according to an exemplary embodiment. Specifically, FIGS. 8A and 8B illustrate a coding unit and a prediction unit according to an exemplary embodiment.

FIG. 8A shows a division shape selected by the apparatus 100 for encoding an image illustrated in FIG. 1, in order to encode a maximum coding unit 810. The apparatus 100 for encoding an image divides the maximum coding unit 810 into various shapes, performs encoding thereon, and selects an optimal division shape by comparing encoding results of the various division shapes with each other based on R-D costs. When it is optimal that the maximum coding unit 810 is encoded as it is, the maximum coding unit 810 may be encoded without dividing the maximum coding unit 810 as illustrated in FIGS. 8A through 8D.

Referring to FIG. 8B, the maximum coding unit 810 whose depth is 0 is encoded by dividing it into sub coding units whose depths are equal to or greater than 1. That is, the maximum coding unit 810 is divided into four sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

FIG. 8B shows a division shape of a prediction unit for the maximum coding unit 810. Referring to FIG. 8B, a prediction unit 860 for the maximum coding unit 810 may be divided differently from the maximum coding unit 810. In other words, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some sub coding units 814, 816, 850, and 852 from among sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
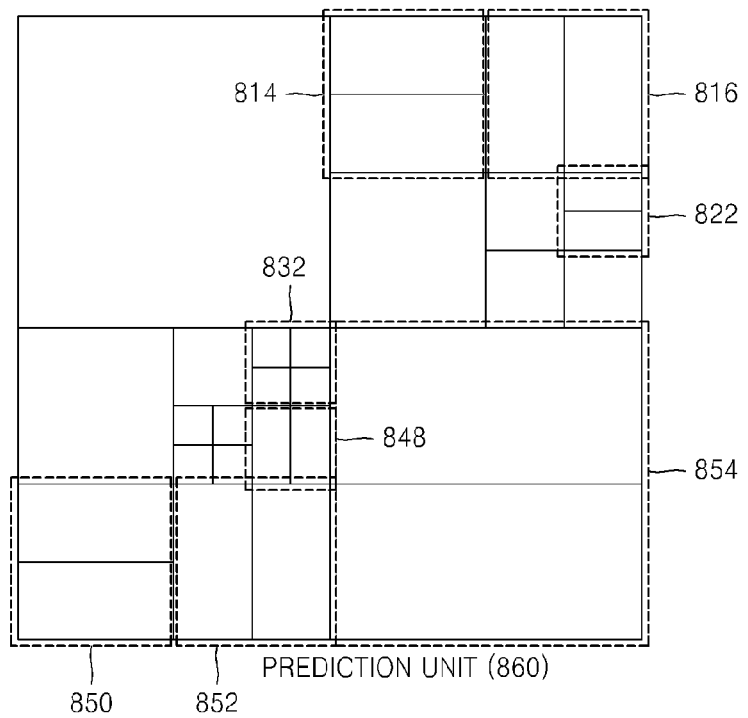
Figure 8D:
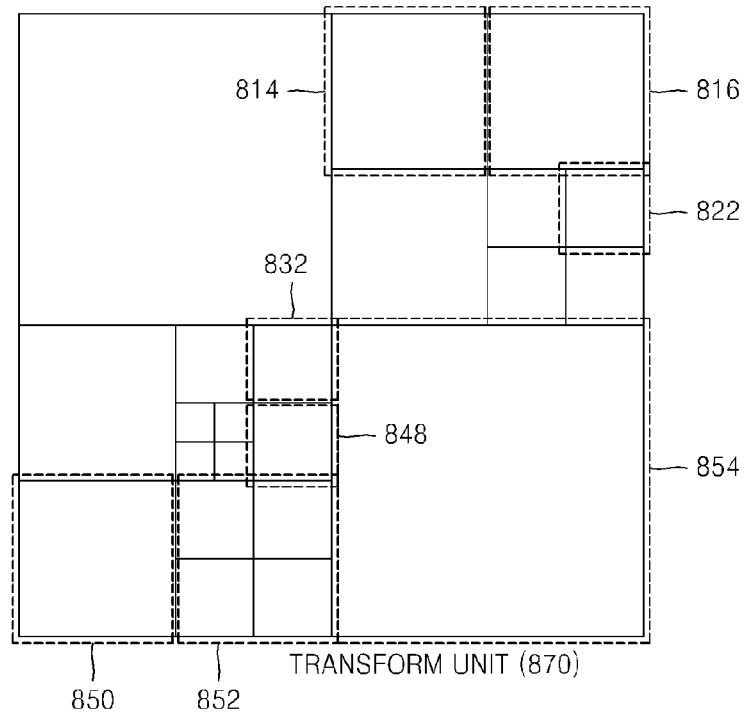

FIGS. 8C and 8D illustrate a prediction unit and a transform unit, according to an exemplary embodiment.

FIG. 8C shows a division shape of a prediction unit for the maximum coding unit 810 shown in FIG. 8B, and FIG. 8D shows a division shape of a transform unit of the maximum coding unit 810.

Referring to FIG. 8D, a division shape of a transform unit 870 may be set differently from the prediction unit 860.

For example, even though a prediction unit for the coding unit 854 whose depth is 1 is selected with a shape whereby the height of the coding unit 854 is equally divided by two, a transform unit may be selected with the same size as the coding unit 854. Likewise, even though prediction units for coding units 814 and 850 whose depths are 2 are selected with a shape whereby the height of each of the coding units 814 and 850 is equally divided by two, a transform unit may be selected with the same size as the original size of each of the coding units 814 and 850.

A transform unit may be selected with a smaller size than a prediction unit. For example, when a prediction unit for the coding unit 852 whose depth is 2 is selected with a shape whereby the width of the coding unit 852 is equally divided by two, a transform unit may be selected with a shape whereby the coding unit 852 is equally divided by four in directions of height and width, which has a smaller size than the shape of the prediction unit.

Figure 9:
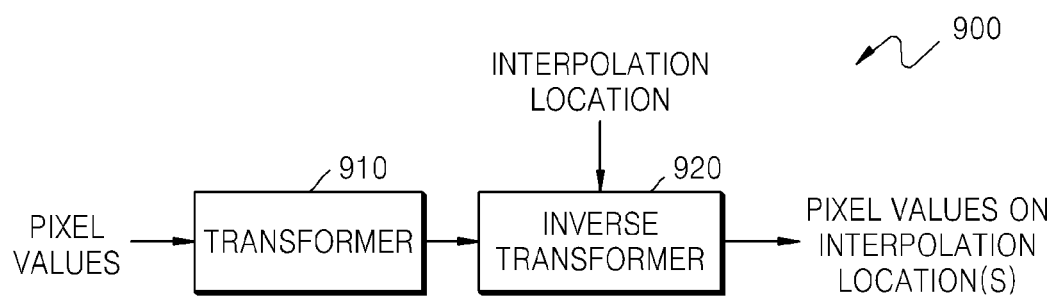
FIG. 9 is a block diagram of an image interpolation apparatus according to an exemplary embodiment.

FIG. 9 is a block diagram of an image interpolation apparatus 900 according to an exemplary embodiment. Image interpolation may be used to convert an image having a low resolution to an image having a high resolution. Also, image interpolation may be used to convert an interlaced image to a progressive image or may be used to up-sample an image having a low resolution to a higher resolution. When the image encoder 400 of FIG. 4 encodes an image, the motion estimator 420 and the motion compensator 425 may perform inter prediction by using an interpolated reference frame. That is, referring to FIG. 4, an image having a high resolution may be generated by interpolating the reference frame 495, and motion estimation and compensation may be performed based on the image having the high resolution, thereby increasing the precision of inter prediction. Likewise, when the image decoder 500 of FIG. 5 decodes an image, the motion compensator 550 may perform motion compensation by using an interpolated reference frame, thereby increasing the precision of inter prediction.

Referring to FIG. 9, the image interpolation apparatus 900 includes a transformer 910 and an inverse transformer 920.

The transformer 910 transforms pixel values by using a plurality of basis functions having different frequencies. The transform may be one of various processes of transforming pixel values in a spatial domain into frequency-domain coefficients, and may be, for example, DCT as described above. Pixel values of an integer pixel unit are transformed using the plurality of basis functions. The pixel values may be pixel values of luminance components or of chroma components.

The type of the plurality of basis functions is not limited, and may be one of various types of functions for transforming pixel values in a spatial domain into a frequency-domain value(s). For example, the plurality of basis functions may be cosine functions for performing DCT or inverse DCT. Also, various types of basis functions, such as sine basis functions or polynomial basis functions, may be used. Examples of DCT may include modified DCT, and modified DCT that uses windowing.

The inverse transformer 920 shifts the phases of the plurality of basis functions used for performing transform by the transformer 910, and inverse transforms a plurality of coefficients, i.e., the frequency-domain values, which are generated by the transformer 910, by using the plurality of basis functions, the phases of which are shifted. Transform performed by the transformer 910 and inverse transform performed by the inverse transformer 920 will now be described by using two-dimensional (2D) DCT and one-dimensional (1D) DCT.

<2D DCT and 2D Inverse DCT>

Figure 10:
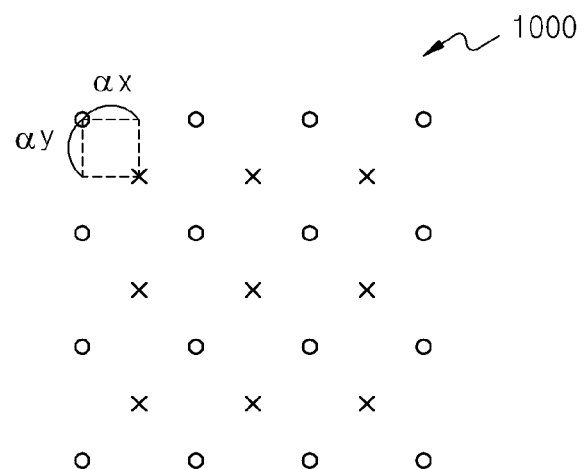
FIG. 10 is a diagram illustrating a two-dimensional (2D) interpolation method performed by the image interpolation apparatus of FIG. 9, according to an exemplary embodiment.

FIG. 10 is a diagram illustrating a 2D interpolation method performed by the image interpolation apparatus 900 of FIG. 9, according to an exemplary embodiment. Referring to FIG. 10, the image interpolation apparatus 900 generates pixel values on locations X, i.e., interpolation locations, by interpolating between pixel values of integer pixel units in the spatial domain, e.g., pixel values on locations O in a block 1000. The pixel values on the locations X are pixel values of fractional pixel units, the interpolation locations of which are determined by '$\alpha_x$' and '$\alpha_y$'. Although FIG. 10 illustrates a case where the block 1000 has a size of 4×4, the size of the block 1000 is not limited to 4×4, and it would be obvious to those of ordinary skill in the art that pixel values of fractional pixel units may be generated by performing 2D DCT and 2D inverse DCT on a block that is smaller or larger than the block 1000.

First, the transformer 910 performs 2D DCT on the pixel values of the integer pixel units. 2D DCT may be performed according to the following equation:

$$C = D(x) \times REF \times D(y) \quad (1),$$

wherein 'C' denotes a block that includes frequency-domain coefficients obtained by performing 2D DCT, 'REF' denotes the block 1000 on which DCT is performed, 'D(x)' is a matrix for performing DCT in the X-axis direction, i.e., the horizontal direction, and 'D(y)' denotes a matrix for performing DCT in the Y-axis direction, i.e., the vertical direction. Here, 'D(x)' and 'D(y)' may be defined by the following equation (2):

$$D_{kl}(x) = \frac{2}{S_x} \cos\left(\frac{(2l+1)k\pi}{2S_x}\right) \quad (2)$$

$$O \le k \le S_x - 1$$

$$O \le l \le S_x - 1,$$

wherein 'k' and 'l' denote integers each satisfying the condition expressed in Equation (2), '$D_{kl}(x)$' denotes a $k^{th}$ row and an $l^{th}$ column of a square matrix D(x), and $S_x$ denotes the horizontal and vertical sizes of the square matrix D(x).

$$D_{kl}(y) = \frac{2}{S_y} \cos\left(\frac{(2l+1)k\pi}{2S_y}\right) \quad (3)$$

$$O \le k \le S_y - 1$$

$$O \le l \le S_y - 1,$$

wherein 'k' and 'l' denote integers each satisfying the condition expressed in Equation (3), $D_{kl}(y)$ denotes a $k^{th}$ row and an $l^{th}$ column of a square matrix D(y), and $S_y$ denotes the horizontal and vertical sizes of the square matrix D(y).

The transformer 910 performs 2D DCT on the block 1000 by calculating Equation (1), and the inverse transformer 910 performs 2D inverse DCT on the frequency-domain coefficients generated by the transformer 910 by calculating the following equation:

$$P = W(x) \times D(x) \times REF \times D(y) \times W(y) \quad (4),$$

wherein 'P' denotes a block including pixel values on an interpolation location, i.e., the location X, which are obtained by performing inverse DCT.

Compared to Equation (1), Equation (4) is obtained by multiplying both sides of the block C by 'W(x)' and 'W(y)', respectively, so as to perform inverse DCT on the block C. Here, 'W(x)' denotes a matrix for performing inverse DCT in the horizontal direction, and 'W(y)' denotes performing inverse DCT in the vertical direction.

As described above, the inverse transformer 910 uses the plurality of basis functions, the phases of which are shifted, so as to perform 2D inverse DCT. 'W(x)' and 'W(y)' may be defined by the following equations (5) and (6):

$$W_{l0}(x) = \frac{1}{2} \quad (5)$$

$$W_{lk}(x) = \cos\left(\frac{(2l+1+2\alpha_x)k\pi}{2S_x}\right),$$

$$O \le k \le S_x - 1,$$

$$O \le l \le S_x - 1,$$

wherein 'l' and 'k' denote integers each satisfying the condition expressed in Equation (5), '$W_{lk}(x)$' denotes an $l^{th}$ row and a $k^{th}$ column of a square matrix W(x), and $S_x$ denotes the horizontal and vertical sizes of the square matrix W(x). $\alpha_x$ denotes a horizontal interpolation location as illustrated in FIG. 10, and may be a fractional number, e.g., ½, ¼, ¾, ⅛, ⅜, ⅝, ⅞, 1/16, or . . . . However, the fractional number is not limited thereto, and $\alpha_x$ may be a real number.

$$W_{l0}(y) = \frac{1}{2} \quad (6)$$

$$W_{lk}(y) = \cos\left(\frac{(2l+1+2\alpha_y)k\pi}{2S_y}\right),$$

$$O \le k \le S_y - 1,$$

$$O \le l \le S_y - 1,$$

wherein 'l' and 'k' denote integers each satisfying the condition expressed in Equation (6), '$W_{lk}(y)$' denotes an $l^{th}$ row and an $k^{th}$ column of a square matrix W(y), and $S_y$ denotes the horizontal and vertical sizes of the square matrix W(y). $\alpha_y$ denotes a vertical interpolation location as illustrated in FIG. 10, and may be a fractional number, e.g., ½, ¼, ¾, ⅛, ⅜, ⅝, ⅞, 1/16, or . . . . However, the fractional number is not limited thereto, and $\alpha_y$ may be a real number.

Compared to Equations (2) and (3), the phases of the plurality of basis functions used by the inverse transformer 910, i.e., a plurality of cosine functions, are shifted by $2\alpha_x$ and $2\alpha_y$, respectively, in Equations (5) and (6). If the inverse transformer 910 performs 2D inverse DCT based on the plurality of cosine functions, the phases of which are shifted, as expressed in Equations (5) and (6), then the pixel values of the locations X are generated.

Figure 11:
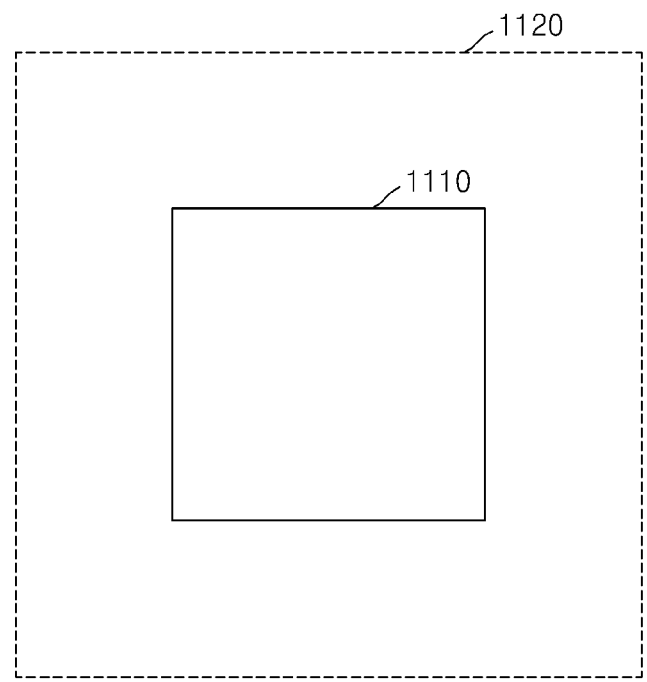
FIG. 11 is a diagram illustrating an interpolation region according to an exemplary embodiment.

FIG. 11 is a diagram illustrating an interpolation region 1110 according to an exemplary embodiment. When the transformer 910 and the inverse transformer 920 of FIG. 9 generate pixel values on interpolation locations by performing 2D DCT and 2D inverse DCT, respectively, a region 1120 that is larger than a block that is to be interpolated, i.e., an interpolation region 1110, may be used. In general, the precision of interpolation may be lowered at the borders of the interpolation region 1110, and thus, the correlation between pixel values adjacent to an interpolation location may be considered for interpolation. The image interpolation apparatus 900 of FIG. 9 performs 2D DCT on pixel values included in the interpolation region 1110 and then performs 2D inverse DCT on the result of performing the 2D DCT, wherein the correlation between the pixel values included in the interpolation region 1110 and pixel values outside the interpolation region 1110 is not considered.

Thus, the image interpolation apparatus 900 performs interpolation on the region 1120, which is larger than the interpolation region 1110 and includes the interpolation region 1110 and a region adjacent to the interpolation region 1110, and uses the pixel values in the interpolation region 1110 for motion compensation.

<1D DCT and 1D Inverse DCT>

Figure 12:
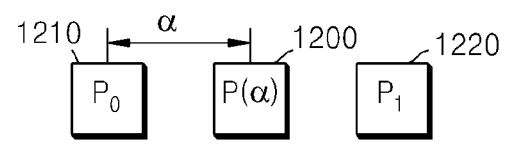
FIG. 12 is a diagram illustrating a one-dimensional (1D) interpolation method according to an exemplary embodiment.

FIG. 12 is a diagram illustrating a 1D interpolation method according to an exemplary embodiment. Referring to FIG. 12, the image interpolation apparatus 900 of FIG. 9 generates a pixel value 1200 on an interpolation location by interpolating between a pixel value 1210 and a pixel value 1220 of integer pixel units in a spatial domain. The pixel value 1200 is a pixel value of a fractional pixel unit, the interpolation location of which is determined by 'α'. The 1D interpolation method according to the current exemplary embodiment will be described below in detail with reference to FIG. 13.

Figure 13:
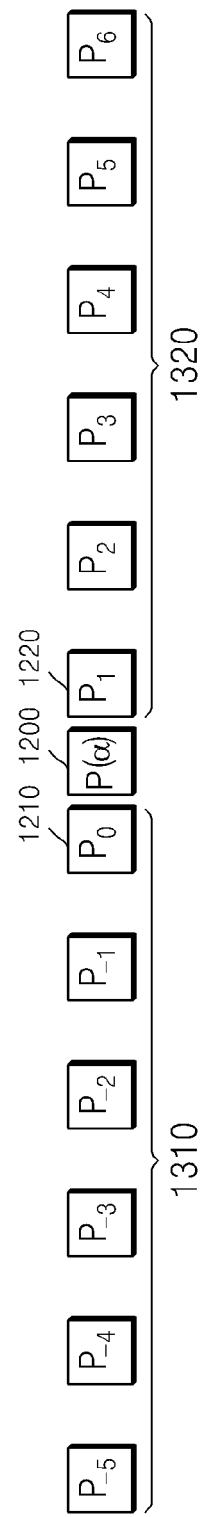
FIG. 13 is a diagram specifically illustrating a 1D interpolation method performed by the image interpolation apparatus of FIG. 9, according to an exemplary embodiment.

FIG. 13 is a diagram specifically illustrating a 1D interpolation method performed by the image interpolation apparatus 900 of FIG. 9, according to an exemplary embodiment. Referring to FIG. 13, a plurality of adjacent pixel values 1310 and 1320 that include pixel values 1210 and 1220 of integer pixel units, respectively, are used to generate a pixel value 1200 of a fractional pixel unit by interpolating between the two pixel values 1210 and 1220. In other words, 1D DCT is performed on $-(M-1)^{th}$ to $M^{th}$ pixel values, i.e., 2M pixel values, 1D inverse DCT is performed on the result of performing the 1D DCT, based on a plurality of basis functions, the phases of which are shifted, thereby interpolating between a $0^{th}$ pixel and a $1^{st}$ pixel. FIG. 13 illustrates a case where M=6, but 'M' is not limited to 6 and may be any positive integer greater than 0.

Figure 18A:
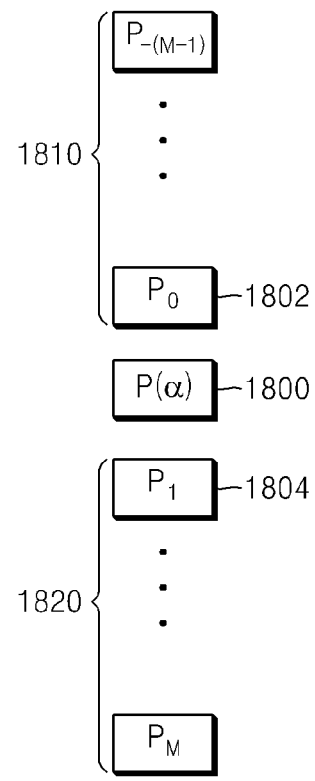
FIGS. 18A and 18B illustrate methods of interpolating pixel values in various directions by using a 1D interpolation filter, according to exemplary embodiments.
Figure 18B:
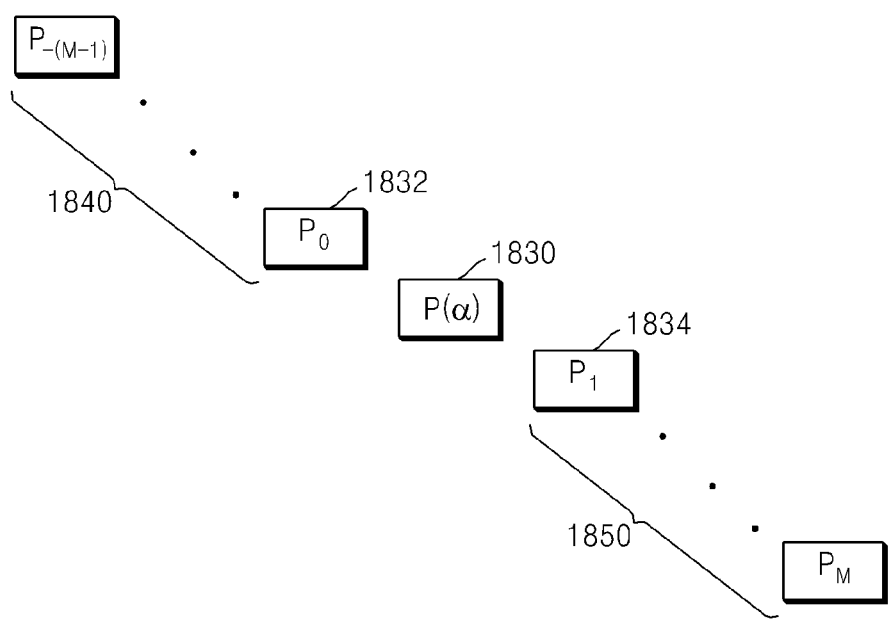

Also, FIGS. 12 and 13 illustrate cases where interpolation is performed between pixel values adjacent in the horizontal direction, but it would be obvious to those of ordinary skill in the art that the 1D interpolation methods of FIGS. 12 and 13 may be used to interpolate between pixel values adjacent in the vertical direction or a diagonal direction (See FIGS. 18A and 18B for more details).

The transformer 910 performs 1D DCT on pixel values of integer pixel units. The 1D DCT may be performed by calculating the following equation:

$$C_k = \frac{1}{M} \sum_{l=-M+1}^{M} p(l) \cos\left(\frac{(2l-1+2M)k\pi}{4M}\right) \quad (7)$$

$$O \le k \le 2M - 1,$$

wherein 'p(l)' denotes the $-(M-1)^{th}$ to $M^{th}$ pixel values, for example, the $-5^{th}$ to $6^{th}$ pixel values 1310 and 1320 illustrated in FIG. 13, and '$C_k$' denotes a plurality of coefficients obtained by performing 1D DCT on the pixel values. Here, 'k' denotes a positive integer satisfying the condition expressed in Equation (7).

When the transformer 910 performs 1D DCT on the pixel values 1310 and 1320 by calculating Equation (7), the inverse transformer 920 performs 1D inverse DCT on frequency-domain coefficients generated by the transformer 910 by calculating the following Equation (8).

$$P(\alpha) = \frac{C_0}{2} + \sum_{k=1}^{2M-1} C_k \cos\left(\frac{(2\alpha - 1 + 2M)k\pi}{4M}\right), \quad (8)$$

wherein 'α' denotes an interpolation location between two pixel values as described above with reference to FIG. 13, and may be one of various fractional numbers, e.g., ½, ¼, ¾, ⅛, ⅜, ⅝, ⅞, 1/16, . . . . The fractional numbers are not limited, and 'α' may be a real number. 'P(α)' denotes the pixel value 1200 on the interpolation location generated by performing 1D inverse DCT. Compared to Equation (7), the phase of the cosine function expressed in Equation (8), which is a basis function used for performing 1D inverse DCT, is determined by the fractional number 'α' other than an integer 'l', and is thus different from the phase of the basis function used for performing 1D DCT.

Figures 14, 15:
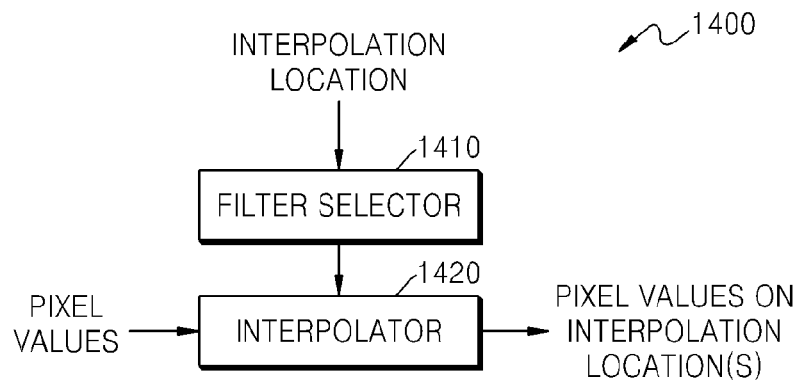
FIG. 14 is a block diagram of an image interpolation apparatus according to an exemplary embodiment.
FIG. 15 illustrates 2D interpolation filters according to an exemplary embodiment.

FIG. 14 is a block diagram of an image interpolation apparatus 1400 according to an exemplary embodiment. Referring to FIG. 14, the image interpolation apparatus 1400 includes a filter selector 1410 and an interpolator 1420. The image interpolation apparatus 900 of FIG. 9 transforms an image and inversely transforms the result of transforming based on a plurality of basis functions, the phases of which are shifted. However, if transform and inverse transform are performed whenever pixel values are input to the image interpolation apparatus 900, the amount of calculation required is large, thereby decreasing the operating speed of an image processing system.

Thus, image interpolation may be quickly performed in a spatial domain without having to transform the spatial domain to a frequency domain by calculating filter coefficients for performing transform and inverse transform described above and then filtering pixel values in the spatial domain, which are to be input to the image interpolation apparatus 1400, by using the calculated filter coefficients.

The filter selector 1410 receives information regarding an interpolation location and selects a filter to be used for interpolation. As described above, the filter is used to transform pixel values based on a plurality of basis functions having different frequencies and to inversely transform a plurality of coefficients, which are obtained through the transform, based on the plurality of basis functions, the phases of which are shifted. The filter coefficients may vary according to an interpolation location, and the filter is selected according to the interpolation location.

As described above with reference to FIG. 9, the pixel values are transformed using the plurality of basis functions having different frequencies, and the phases of the plurality of basis functions having different frequencies are shifted according to the interpolation location so as to perform inverse transform. Then, the pixel values on the interpolation location may be interpolated by inversely transforming the plurality of coefficients by using the plurality of basis functions, the phases of which are shifted. In other words, if transform is performed based on pixel values of integer pixel units and inverse transform is performed based on the plurality of basis functions, the phases of which are shifted, according to the interpolation location, then pixel values of at least one fractional pixel unit may be generated for various interpolation locations. Thus, the filter selector 1410 of FIG. 14 presets a plurality of filters for performing transform and performing inverse transform based on different basis functions, and selects one of the preset filters, based on information regarding an interpolation location.

The interpolator 1420 performs interpolation by using the filter selected by the filter selector 1410. Specifically, interpolation is performed by filtering a plurality of pixel values of integer pixel units based on the selected filter. As the result of interpolation, a pixel value(s) on a predetermined interpolation location, i.e., a pixel value(s) of a fractional pixel unit, is(are) obtained. Referring to FIG. 10, if a block that includes a plurality of pixel values of integer pixel units is filtered with a 2D filter, then a plurality of pixel values on interpolation locations, each of which is determined by '$\alpha_x$' and '$\alpha_y$', are generated. Referring to FIG. 13, if a row or column including a plurality of pixel values of integer pixel units is filtered with a 1D filter, then a plurality of pixel values on interpolations α are generated. Interpolation methods performed using the 2D filter and the 1D filter, respectively, will now be described below with reference to the accompanying drawings.

<2D Filter>

$$P = W(x) \times D(x) \times REF \times D(y) \times W(y)$$

as described above in relation to Equation (4). This equation may also be expressed as follows:

$$P = F(x) \times REF \times F(y) \quad (9),$$

wherein '$F(x)$' denotes a filter for transforming a REF block in the horizontal direction and for inverse transforming the result of transforming in the horizontal direction by using the plurality of basis functions, the phases of which are shifted. '$F(y)$' denotes a filter for transforming the REF block in the vertical direction and for inverse transforming the result of transforming in the vertical direction by using the plurality of basis functions, the phases of which are shifted. For example, '$F(x)$' may denote a filter for performing DCT on the REF block in the horizontal direction, and performing inverse DCT on the result of performing in the horizontal direction by using a plurality of cosine functions, the phases of which are shifted. '$F(y)$' may denote a filter for performing DCT on the REF block in the vertical direction, and performing inverse DCT on the result of performing in the vertical direction by using a plurality of cosine functions, the phases of which are shifted.

According to Equations (2), (3), (5), and (6), the filters $F(x)$ and $F(y)$ may be defined by the following Equations (10) and (11):

$$F_{kl}(x) = \sum_{n=0}^{S_x-1} W_{kn}(x) D_{nl}(x) \quad (10)$$

$$0 \le k \le S_x - 1$$

$$0 \le l \le S_x - 1,$$

wherein '$k$' and '$l$' denote integers each satisfying the condition expressed in Equation (10), '$F_{kl}(x)$' denotes a $k^{th}$ row and a $l^{th}$ column of a matrix $F(x)$, and $S_x$ denotes the horizontal and vertical sizes of square matrices $W(x)$ and $D(x)$. Since the square matrices $W(x)$ and $D(x)$ have the same size, the horizontal and vertical sizes thereof are also the same. '$W_{kn}(x)$' denotes a $k^{th}$ row and a $n^{th}$ column of the square matrix $W(x)$ described above in relation to Equation (5). $D_{nl}(x)$ denotes an $n^{th}$ row and an $l^{th}$ column of the square matrix $D(x)$ described above in relation to Equation (2).

$$F_{kl}(y) = \sum_{n=0}^{S_y-1} D_{kn}(y) W_{nl}(y) \quad (11)$$

$$0 \le k \le S_y - 1$$

$$0 \le l \le S_y - 1,$$

wherein '$k$' and '$l$' denote integers each satisfying the condition expressed in Equation (11), '$F_{kl}(y)$' denotes a $k^{th}$ row and a $l^{th}$ column of a matrix $F(y)$, and $S_y$ denotes the horizontal and vertical sizes of square matrices $W(y)$ and $D(y)$. Since the square matrices $W(y)$ and $D(y)$ have the same size, the horizontal and vertical sizes thereof are also the same. '$W_{nl}(y)$' denotes an $n^{th}$ row and an $l^{th}$ column of the square matrix $W(y)$ described above in relation to Equation (5). '$D_{kn}(y)$' denotes a $k^{th}$ row and a $n^{th}$ column of the square matrix $D(y)$ described above in relation to Equation (2).

If interpolation is performed by increasing bit-depths of the filters $F(x)$ and $F(y)$, the precision of filtering may be improved. Thus, according to an exemplary embodiment, coefficients of the filters $F(x)$ and $F(y)$ are increased by multiplying them by a predetermined value, and an image may be interpolated using these filters including the increased coefficients. In this case, Equation (9) may be changed as follows:

$$P = (F'(x) \times REF \times F'(y))/S^2 \quad (12),$$

wherein '$F'(x)$' denotes a filter scaled by multiplying the coefficients of the filter $F(x)$ by a scaling factor '$S$' and rounding off the result of multiplication to an integer, and '$F'(y)$' denotes a filter obtained by multiplying the coefficients of the filter $F(y)$ by '$S$' and rounding off the result of multiplication to an integer. Since interpolation is performed using the scaled filter, the pixel values on the interpolation locations are calculated and are then divided by '$S^2$' to compensate for the scaling effect.

FIG. 15 illustrates 2D interpolation filters according to an exemplary embodiment. Specifically, FIG. 15 illustrates filter coefficients scaled according to Equation (2). That is, FIG. 15 illustrates 2D interpolation filters $F'(x)$ when '$\alpha_x$' is ¼, ½, and ¾, wherein the 2D interpolation filters $F'(x)$ are generated by multiplying the coefficients of the 2D interpolation filter $F(x)$ by a scaling factor $2^{13}$. A 2D interpolation filter $F'(y)$ when '$\alpha_y$' is ¼, ½, and ¾, may be used by transposing the filter $F'(x)$.

Referring to FIG. 14, if the filter selector 1410 selects one of the 2D interpolation filters of FIG. 15 based on an interpolation location, the interpolator 1420 generates pixel values on the interpolation location by calculating Equation (9) or (12).

<1D Filter>

1D DCT according to Equation (7) may be expressed as the following determinant:

$$C = D \times REF \quad (13),$$

wherein 'C' denotes a (2M×1) matrix for 2M coefficients described above in relation to Equation (7), and 'REF' denotes a (2M×1) matrix for pixel values of integer pixel units described above in relation to Equation (7), i.e., $P_{-(M-1)}, \ldots$ through to $P_M$. The total number of pixel values used for interpolation, i.e., 2M, denotes the total number of taps of a 1D interpolation filter. 'D' denotes a square matrix for 1D DCT, which may be defined as follows:

$$D_{kl} = \frac{1}{M} \cos\left(\frac{(2l-1+2M)k\pi}{4M}\right) \quad (14)$$

$$0 \le k \le 2M - 1 - (M-1) \le l \le M,$$

wherein 'k' and 'l' denote integers each satisfying the condition expressed in Equation (14), '$D_{kl}$' denotes a $k^{th}$ row and a $l^{th}$ column of a square matrix D for 1D DCT expressed in Equation (13), and 'M' has been described above in relation to Equation (13).

1D DCT using a plurality of basis functions, the phases of which are shifted, according to Equation (8) may be expressed as the following determinant:

$$P(\alpha) = W(\alpha) \times C \quad (15),$$

wherein '$P(\alpha)$' is the same as '$P(\alpha)$' expressed in Equation (8), and '$W(\alpha)$' denotes a (1×2M) matrix for 1D inverse DCT using a plurality of basis functions, the phases of which are shifted. '$W(\alpha)$' may be defined as follows:

$$W_0(\alpha) = \frac{1}{2} \quad (16)$$

$$W_k(\alpha) = \cos\left(\frac{(2\alpha - 1 + 2M)k\pi}{4M}\right)$$

$$1 \le k \le 2M - 1$$

wherein 'k' denotes an integer satisfying the condition expressed in Equation (16), and '$W_k(\alpha)$' denotes a $k^{th}$ column of the $W(\alpha)$ matrix described above in relation to Equation (15). A 1D interpolation filter $F(\alpha)$ for performing 1D DCT and 1D inverse DCT that uses a plurality of basis functions, the phases of which are shifted, based on Equations (13) and (15), may be defined as follows:

$$P(\alpha) = F(\alpha) \times REF \quad (17)$$

$$F_l(\alpha) = \sum_{k=0}^{2M-1} W_k(\alpha) D_{kl}$$

$$0 \le k \le 2M - 1 - (M-1) \le l \le M,$$

wherein 'k' and 'l' denote integers each satisfying the condition expressed in Equation (17), '$F_l(a)$' denotes an $l^{th}$ column of the filter $F(\alpha)$, and '$W(\alpha)$' and 'D' are the same as '$W(\alpha)$' and 'D' expressed in Equation (13).

The precision of filtering may be improved by increasing the bit-depth of the 1D interpolation filter $F(\alpha)$ similar to a 2D interpolation filter. An image may be interpolated by increasing the coefficients of the 1D interpolation filter $F(\alpha)$ by multiplying them with a predetermined value and using the 1D interpolation filter $F(\alpha)$ including the increased coefficients.

For example, interpolation may be performed by multiplying the 1D interpolation filter $F(\alpha)$ by a scaling factor '$2^{ScalingBits}$'. In this case, $P(\alpha) = F(\alpha) \times REF$ expressed in Equation (17) may be changed as follows:

$$P(\alpha) = \left(\sum_{l=-M+1}^{M} F'_l(\alpha) \cdot REF_l + 2^{ScalingBits-1}\right) \gg ScalingBits, \quad (18)$$

wherein $F'_l(\alpha)$ denotes a filter scaled by multiplying the coefficients of the 1D interpolation filter $F(\alpha)$ by the scaling factor '$2^{ScalingBits}$' and rounding off the result of multiplication to an integer, '$REF_l$' denotes a $l^{th}$ column of the REF matrix expressed in Equation (17), and '$2^{ScalingBits-1}$' denotes a value added to round off a filtered pixel value. A pixel value on an interpolation location $\alpha$ is calculated by multiplying the scaled filter $F'_l(\alpha)$ by a matrix for pixel values, the result of calculation is rounded off by adding the value '$2^{ScalingBits-1}$' thereto, and the resultant value is shifted by an 'Scaling Bits' bit so as to compensate for the scaling effect.

Rounding off used in the Equations described above is just an example of a method of quantizing filter coefficients. In order to generalize a method of quantizing filter coefficients for ease of understanding, filter coefficients may be modified and optimized as expressed in the following Equations (19) and (20):

$$(F_l(\alpha) - \epsilon) \le f'_l(\alpha) \le (F_l(\alpha) + \epsilon) \quad (19),$$

wherein '$F_l(\alpha)$' denotes an $l^{th}$ coefficient of a filter that is not quantized, '$f_l(\alpha)$' denotes an $l^{th}$ coefficient of the filter that is quantized, and '$\epsilon$' denote any real number that may be selected according to a degree of quantization and may be, for example, $0.2 \ast F_l(\alpha)$. According to Equation (19), when the $l^{th}$ coefficient $F_l(\alpha)$ that is a real number is calculated according to Equation (13) to (17), then the $l^{th}$ coefficient $F_l(\alpha)$ is changed to the $l^{th}$ coefficient $f'_l(\alpha)$ satisfying Equation (19), thereby quantizing the $l^{th}$ coefficient $F_l(\alpha)$.

When filter coefficients are scaled by a predetermined scaling factor, quantization according to Equation (19) may be changed as follows:

$$(p \ast F_l(\alpha) - p \ast \epsilon) \le F'_l(\alpha) \le (p \ast F_l(\alpha) + p \ast \epsilon) \quad (20),$$

wherein 'p' denotes a scaling factor (which may be '$2^{ScalingBits}$'), and $p \ast F_l(\alpha)$ denotes a scaled filter coefficient. According to Equation (20), '$p \ast F_l(\alpha)$' is converted to '$F'_l(\alpha)$'.

FIGS. 16A to 16F illustrate 1D interpolation filters according to exemplary embodiments. In FIGS. 16A to 16F, the scaled filters described above in relation to Equation (18) are illustrated according to the number of taps and an interpolation location. Specifically, FIGS. 16A to 16F illustrate a 4-tap filter, a 6-tap filter, an 8-tap filter, a 10-tap filter, a 12-tap filter, and a 14-tap filter, respectively. In FIGS. 16A to 16F, a scaling factor for filter coefficients is set to '256', i.e., a ScalingBits is set to '8'.

In FIGS. 16A to 16F, the filter coefficients include coefficients for high-frequency components, whereby the precision of interpolation and prediction may be increased but image compression efficiency may be degraded due to the high-frequency components. However, interpolation is performed to increase image compression efficiency as described above with reference to FIG. 9. To solve this problem, the filter coefficients illustrated in FIGS. 16A to 16F may be adjusted to increase image compression efficiency in this case.

For example, an absolute value of each of the filter coefficients may be reduced, and each filter coefficient at the midpoint of each filter may be multiplied by a larger weighted value than weighted values assigned to the other filter coefficients. For example, referring to FIG. 16B, in the 6-tap filter for generating pixel values on a ½ interpolation location, the filter coefficients, {11, −43, 160, 160, −43, 11,} are adjusted in such a manner that absolute values of '11', '−43', and '160' may be reduced and only '160' at the midpoint of the 6-tap filter is multiplied by a weighted value.

FIGS. 17A to 17Y illustrate optimized 1D interpolation filters according to exemplary embodiments. The filters illustrated in FIGS. 16A to 16F may also be adjusted to easily embody the filter by hardware. When Equation (17) or (18) is calculated using a computer, filter coefficients may be optimized to minimize an arithmetical operation, e.g., bit shifting of binary numbers and addition.

In FIGS. 17A and 17B, the amount of calculation needed to perform filtering for interpolation of each filter is indicated in both "adding" and "shift" units. Each of the filters of FIGS. 17A to 17M includes coefficients optimized to minimize the "adding" and "shift" units on a corresponding interpolation location.

FIGS. 17A and 17B illustrate a 6-tap filter and a 12-tap filter optimized to interpolate an image with the precision of ¼ pixel scaled by an offset of 8 bits, respectively. FIGS. 17C, 17D, and 17E illustrate 8-tap filters optimized to interpolate an image with the precision of ¼ pixel scaled by an offset of 8 bits. The 8-tap filters of FIGS. 17C to 17E are classified according to at least one of whether filter coefficients are to be optimized and a method of optimizing filter coefficients. FIGS. 17F and 17G illustrate 8-tap filters optimized to interpolate an image with the precision of ¼ pixel scaled by an offset of 6 bits. The filters of FIGS. 17F and 17G may be classified according to a method of optimizing filter coefficients.

FIG. 17H illustrates a 6-tap filter optimized to interpolate an image with the precision of ⅛ pixel scaled by an offset of 6 bits. FIG. 17I illustrates a 6-tap filter optimized to interpolate an image with the precision of ⅛ pixel scaled by an offset of 8 bits.

FIGS. 17J and 17K illustrate 4-tap filters optimized to interpolate an image with the precision of ⅛ pixel scaled by an offset of 5 bits. The filters of FIGS. 17J and 17K may be classified according to a method of optimizing filter coefficients. FIGS. 17L and 17M illustrate 4-tap filters optimized to interpolate an image with the precision of ⅛ pixel scaled by an offset of 8 bits. The filters of FIGS. 17L and 17M may also be classified according to a method of optimizing filter coefficients.

FIGS. 17N to 17Y illustrate a 4-tap filter, a 6-tap filter, an 8-tap filter, a 10-tap filter, and a 12-tap filter optimized to interpolate an image with the precision of ⅛ pixel scaled by an offset of 8 bits, respectively. The filters of FIGS. 17N to 17Y are different from the filters of FIGS. 17A to 17M in that some of the filter coefficients are different, but are the same as the filters of FIGS. 17A to 17M in that a filter coefficient for interpolating a ⅛ interpolation location is symmetrical with a filter coefficient for interpolating a ⅞ interpolation location, a filter coefficient for interpolating a ⅔ interpolation location is symmetrical with a filter coefficient for interpolating a ⅝ interpolation location, and a filter coefficient for interpolating a ⅜ interpolation location is symmetrical with a filter coefficient for interpolating a ⅝ interpolation location.

FIGS. 23A to 23E illustrate methods of performing scaling and rounding off in relation to a 1D interpolation filter, according to exemplary embodiments.

As described above, interpolation filtering uses DCT and inverse DCT, and the 1D interpolation filter thus includes filter coefficients, the absolute values of which are less than '1'. Thus, as described above in relation to Equation (12), the filter coefficients are scaled by multiplying them by '$2^{offset}$', are rounded off to integers, respectively, and are then used for interpolation.

FIG. 23A illustrates filter coefficients scaled by '$2^{Scaling\_Bits}$' when 1D interpolation filters are 12-tap filters. Referring to FIG. 23A, the filter coefficients have been scaled but are not rounded off to integers. (rewrite . . . okay?)

FIG. 23B illustrates the result of rounding off the scaled filter coefficients of FIG. 23A to integers by rounding them off to the tenth decimal point. Referring to FIG. 23B, some interpolation filters, the sum of rounding off the scaled filter coefficients of which is less than '256' from among the 1D interpolation filters. Specifically, the sum of all the filter coefficients of each of a filter for interpolating pixel values on an ⅛ interpolation location, a filter for interpolating pixel values on a ⅜ interpolation location, a filter for interpolating pixel values on a ⅝ interpolation location, and a filter for interpolating pixel values on a ⅞ interpolation location, is less than '256'. That is, the sum of filter coefficients of a filter scaled by an offset of 8 bits should be '256' but an error occurs during rounding off of the filter coefficients.

That the sums of filter coefficients are not the same means that pixel values may vary according to an interpolation location. To solve this problem, a normalized filter may be generated by adjusting filter coefficients. FIG. 23C illustrates a normalized filter generated by the filter coefficients of the filters illustrated in FIG. 23B.

A comparison of FIGS. 23B and 23C reveals that the sums of all the filter coefficients are normalized to '256' by adjusting some of the filter coefficients of the filter for interpolating the pixel values on the ⅛ interpolation location, the filter for interpolating the pixel values on the ⅜ interpolation location, the filter for interpolating the pixel values on the ⅝ interpolation location, and the filter for interpolating pixel values on the ⅞ interpolation location.

FIGS. 23D and 23E illustrate 8-tap filters that are scaled, and the result of normalizing the 8-tap filters, respectively. If the 8-tap filters that are scaled by $2^{offset}$ are as illustrated in FIG. 23D, then the result of rounding off filter coefficients of the 8-tap filters of FIG. 23D to integer value and normalizing the result of rounding off in such a manner that the sums of the filter coefficients are '256' may be as illustrated in FIG. 23E. Referring to FIG. 23E, some of the filter coefficients are different from the result of rounding off the filter coefficients of the 8-tap filters illustrated in FIG. 23D. This means that some of the filter coefficients are adjusted in such a manner that the sums of all the filter coefficients are '256'.

As illustrated in FIGS. 23B and 23C, at least one of resultant filter coefficients obtained by at least one of scaling and rounding off filter coefficients may be different from the result of normalizing the resultant filter coefficients. Thus, it would be obvious to those of ordinary skill in the art that a 1D interpolation filter, at least one from among the filter coefficients of which is changed in a predetermined range of error, e.g., +−1 or +−2, from among the filters illustrated in FIGS.

16A to 16F or the filters illustrated in 17A to 17M should be understood to fall within the scope of exemplary embodiments.

If the filter selector 1410 selects one of the filters illustrated in FIGS. 16A to 16F or FIGS. 17A to 17Y or FIGS. 23A to 23E based on an interpolation location, then the interpolator 1420 generates pixel values on the interpolation location by calculating Equation (17) or (18). The other various factors (such as a direction of inter prediction, a type of loop-filter, a position of pixel in a block) may further be considered for the filter selector 1410 to select one of the filters. A size, i.e., a tap size, of a filter that is to be selected may be determined by either the size of a block that is to be interpolated or a direction of filtering for interpolation. For example, a large filter may be selected when a block that is to be interpolated is large, and a small filter may be selected to minimize memory access when interpolation is to be performed in the vertical direction.

According to an exemplary embodiment, information regarding filter selection may be additionally encoded. For example, if an image was interpolated during encoding of the image, a decoding side should know the type of a filter used to interpolate the image so as to interpolate and decode the image by using the same filter used during the encoding of the image. To this end, information specifying the filter used to interpolate the image may be encoded together with the image. However, when filter selection is performed based on the result of previous encoding of another block, that is, context, information regarding filter selection does not need to be additionally encoded.

If a pixel value generated by performing interpolation is less than a minimum pixel value or is greater than a maximum pixel value, then the pixel value is changed to the minimum or maximum pixel value. For example, if the generated pixel value is less than a minimum pixel value of 0, it is changed to '0', and if the generated pixel value is greater than a maximum pixel value of 255, it is changed to '255'.

When interpolation is performed to precisely perform inter prediction during encoding of an image, information specifying an interpolation filter may be encoded together with the image. In other words, information regarding the type of the filter selected by the filter selector 1410 may be encoded as an image parameter together with the image. Since a different type of an interpolation filter may be selected in coding units or in slice or picture units, information regarding filter selection may also be encoded in the coding units or the slice or picture units, together with the image. However, if filter selection is performed according to an implicit rule, the information regarding filter selection may not be encoded together with the image.

Methods of performing interpolation by the interpolator 1420 according to exemplary embodiments will now be described in detail with reference to FIGS. 18A, 18B, and 19.

FIGS. 18A and 18B illustrate methods of interpolating pixel values in various directions by using a 1D interpolation filter, according to exemplary embodiments. Referring to FIGS. 18A and 18B, pixel values on interpolation locations in various directions may be generated by using a 1D interpolation filter that may perform 1D DCT on 1D pixel values and perform 1D inverse DCT on the result of performing by using a plurality of basis functions, the phases of which are shifted.

Referring to FIG. 18A, a pixel value $P(\alpha)$ 1800 on an interpolation location $\alpha$ in the vertical direction may be generated by interpolating between a pixel value $P_0$ 1802 and a pixel value $P_1$ 1804 that are adjacent in the vertical direction. Compared to the 1D interpolation method of FIG. 13, interpolation is performed using pixel values 1810 and 1820 arranged in the vertical direction instead of the pixel values 1310 and 1320 arranged in the horizontal direction, but the interpolation method described above in relation to Equations (13) to (18) may also be applied to the method of FIG. 18A.

Similarly, compared to the 1D interpolation method of FIG. 13, in the method of FIG. 18B, interpolation is performed using pixel values 1840 and 1850 arranged in a diagonal direction instead of the pixel values 1310 and 1320 arranged in the horizontal direction, but a pixel value $P(\alpha)$ 1830 on an interpolation location $\alpha$ may be generated by interpolating between two adjacent pixel values 1832 and 1834 as described above in relation to Equations (13) to (18).

Figures 19A, 19B:
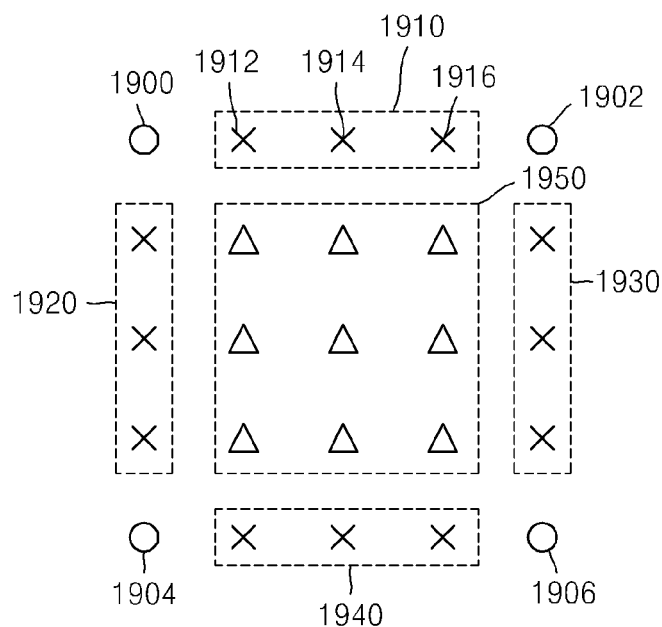
FIG. 19A illustrates a 2D interpolation method according to an exemplary embodiment.
FIG. 19B illustrates a 2D interpolation method using a 1D interpolation filter, according to another exemplary embodiment.

FIG. 19A illustrates a 2D interpolation method according to an exemplary embodiment. Referring to FIG. 19A, pixel values 1910 to 1950 of fractional pixel units may be generated based on pixel values 1900 to 1906 of integer pixel units.

Specifically, first, the filter selector 1410 of the image interpolation apparatus 1400 illustrated in FIG. 14 selects a 1D interpolation filter to generate pixel values 1910, 1920, 1930, and 1940 of fractional pixel units that are present between the pixel values 1900 to 1906 of integer pixel units. As described above with reference to FIG. 14, a different filter may be selected according to an interpolation location. For example, different filters may be selected for pixel values 1912, 1914, and 1916 of a fractional pixel unit, respectively, so as to interpolate the pixel value 1910 between two upper pixel values 1900 and 1902. For example, a filter for generating the pixel value 1914 of a ½ pixel unit may be different from a filter for generating the pixel values 1912 and 1916 of the same ¼ pixel unit. Also, the pixel values 1912 and 1916 of the same ¼ pixel unit may be generated using different filters, respectively. As described above with reference to FIG. 14, a degree of shifting of the phases of basis functions used to perform inverse DCT varies according to an interpolation location, and thus, a filter for performing interpolation is selected according to an interpolation location.

Similarly, the pixel values 1920, 1930, and 1940 of different fractional pixel units present between the pixel values 1900 to 1906 of integer pixel units may be generated based on a 1D interpolation filter selected according to an interpolation location.

If the filter selector 1410 selects a filter for generating the pixel values 1910, 1920, 1930, and 1940 of fractional pixel units present between the pixel values 1900 to 1906 of integer pixel units, then the interpolator 1420 generates the pixel values 1910, 1920, 1930, and 1940 of fractional pixel units on interpolation locations, respectively, based on the selected filter. According to an exemplary embodiment, since a filter for generating a pixel value on each of interpolation locations has been previously calculated, pixel values on all of the interpolation locations may be generated based on pixel values of integer pixel values.

In other words, since the pixel values 1912 and 1916 of the ¼ pixel unit may be generated directly from the pixel values 1900 and 1920 of an integer pixel unit, there is no need to first calculate the pixel value 1914 of a ½ pixel unit and then generate the pixel values 1912 and 1916 of the ¼ pixel unit based on the pixel values 1900 and 1902 of integer pixel units and the pixel value 1914 of the ½ pixel unit. Since image interpolation does not need to be performed sequentially according to the size of a pixel unit, image interpolation may be performed at high speed.

According to another exemplary embodiment, an interpolation method based on an interpolation location according to an exemplary embodiment may be combined with a related interpolation method. For example, a pixel value of a ½ pixel unit and a pixel value of a ¼ pixel unit may be generated directly from the pixel values 1900 and 1920 of the integer pixel unit by using an interpolation filter according to an exemplary embodiment, and a pixel value of a ⅛ pixel unit may be generated from the pixel value of the ¼ pixel unit by using a related linear interpolation filter. Otherwise, only the pixel value of the ½ pixel unit may be generated directly from the pixel values 1900 and 1920 of the integer pixel unit by using the interpolation filter according to an exemplary embodiment, the pixel value of the ¼ pixel unit may be generated from the pixel value of the ½ pixel unit by using the related art linear interpolation filter, and the pixel value of the ⅛ pixel unit may be generated from the pixel value of the ¼ pixel unit by using the related art linear interpolation filter.

If all of the pixel values 1910, 1920, 1930, and 1940 of the fractional pixel units present between the pixel values 1900 to 1906 of the integer pixel units are generated by performing interpolation, then the filter selector 1410 selects a 1D interpolation filter again for interpolating between the pixel values 1910, 1920, 1930, and 1940 of the fractional pixel units. In this case, a different filter is selected according to an interpolation location similar to a manner in which a filter is selected to interpolate between the pixels values 1900 to 1906 of the integer pixel units.

The interpolator 1420 generates the pixel value 1950 of a fractional pixel unit corresponding to each of interpolation locations by using the filter selected by the filter selector 1410. That is, the pixel value 1950 of the fractional pixel units between the pixel values 1910, 1920, 1930, and 1940 of the fractional pixel units is generated.

FIG. 19B illustrates a 2D interpolation method using a 1D interpolation filter, according to another exemplary embodiment. Referring to FIG. 19B, a pixel value on a 2D interpolation location may be generated by repeatedly performing interpolation in the vertical and horizontal directions using the 1D interpolation filter.

Specifically, a pixel value $\text{Temp}_{(i,j)}$ is generated by interpolating between a pixel value $\text{REF}_{(i,j)}$ 1960 and a pixel value $\text{REF}_{(i+1,j)}$ 1964 of an integer pixel unit in the horizontal direction. Also, a pixel value $\text{Temp}_{(i,j+1)}$ is generated by interpolating between a pixel value $\text{REF}_{(i,j+1)}$ 1962 and a pixel value $\text{REF}_{(i+1,j+1)}$ 1966 in the horizontal direction. Then, a pixel value $\text{P}_{(i,j)}$ on a 2D interpolation location is generated by interpolating between the pixel value $\text{Temp}_{(i,j)}$ and the pixel value $\text{Temp}_{(i,j+1)}$ in the vertical direction.

The 1D interpolation filter may be a filter for performing 1D DCT and performing 1D inverse DCT based on a plurality of basis functions, the phases of which are shifted. Also, the 1D interpolation filter may be a scaled filter as described above in relation to Equation (17). When interpolation is performed in the horizontal and vertical directions based on the scaled filter, interpolation may be performed by calculating the following Equation (21):

$$\text{Temp}_{(i,j)} = \left( \sum_{l=-M+1}^{M} F_1'(\alpha_x) \cdot \text{REF}_{(i+l,j)} + 2^{StageBits1-1} \right) \gg StageBits1 \quad (21)$$

$$P_{(i,j)} = \left( \sum_{l=-M+1}^{M} F_1'(\alpha_y) \cdot \text{Temp}_{(i,j+l)} + 2^{StageBits2-1} \right) \gg StageBits2,$$

wherein $F_1'(\alpha_x)$ and $F_1'(\alpha_y)$ correspond to $F_1'(\alpha)$ expressed in Equation (18). However, since a vertical interpolation location may be different from a horizontal interpolation location, a different 1D interpolation filter may be selected according to an interpolation location.

When the horizontal interpolation and the vertical interpolation are performed, first bit shifting is performed according to StageBits1 after the horizontal interpolation and second bit shifting is performed according to StageBits2 after the vertical interpolation. (TotalBits=StageBits1+StageBits2) If StageBits1 is set to zero, the first bit shifting is not performed.

Thus, if a scaling factor for $F_1'(\alpha_y)$ is '$2^{bit1}$' and a scaling factor for $F_1'(\alpha_x)$ is '$2^{bit2}$' in Equation (21), then 'TotalBits='bit1'+'bit2'.

Figure 19C:
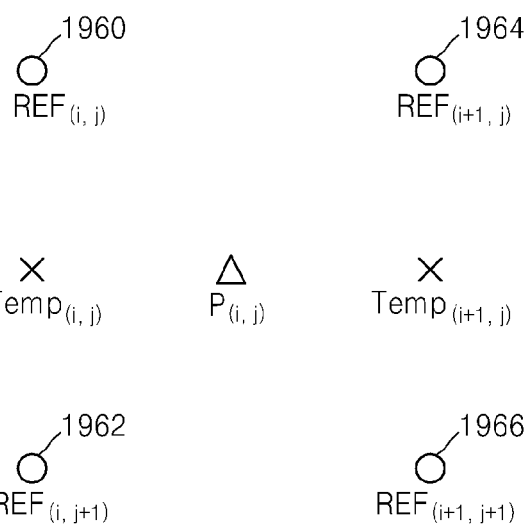
FIG. 19C illustrates a 2D interpolation method using a 1D interpolation filter, according to another exemplary embodiment.

FIG. 19C illustrates a 2D interpolation method using a 1D interpolation filter, according to another exemplary embodiment. Referring to FIG. 19C, a pixel value on a 2D interpolation location may be generated by repeatedly performing interpolation in the vertical and horizontal directions by using the 1D interpolation filter.

Specifically, a pixel value $\text{Temp}_{(i,j)}$ is generated by interpolating between a pixel values $\text{REF}_{(i,j)}$ 1960 and a pixel value $\text{REF}_{(i,j+1)}$ 1962 of an integer pixel unit in the vertical direction. Next, a $\text{Temp}_{(i+1,j)}$ is generated by interpolating between a pixel value $\text{REF}_{(i,j+1)}$ 1964 and a pixel value $\text{REF}_{(i+1,j+1)}$ 1966 in the vertical direction. Then, a pixel value $\text{P}_{(i,j)}$ on a 2D interpolation location is generated by interpolating between the pixel value $\text{Temp}_{(i,j)}$ and the pixel value $\text{Temp}_{(i+1,j)}$. When interpolation is performed in the horizontal and vertical directions based on a scaled filter, interpolation may be performed by calculating the following Equation (22):

$$\text{Temp}_{(i,j)} = \left( \sum_{l=-M+1}^{M} F_1'(\alpha_y) \cdot \text{REF}_{(i,j+l)} + 2^{StageBits1-1} \right) \gg StageBits1 \quad (22)$$

$$P_{(i,j)} = \left( \sum_{l=-M+1}^{M} F_1'(\alpha_x) \cdot \text{Temp}_{(i+l,j)} + 2^{StageBits2-1} \right) \gg StageBits2,$$

Figure 20:
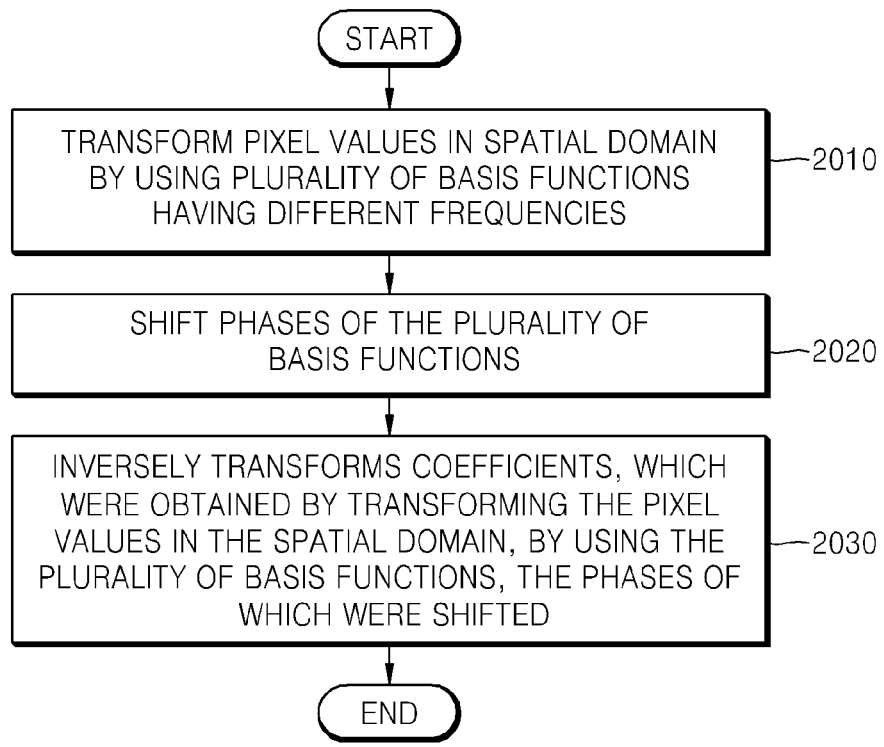
FIG. 20 is a flowchart illustrating an image interpolation method according to an exemplary embodiment.

FIG. 20 is a flowchart illustrating an image interpolation method according to an exemplary embodiment. Referring to FIG. 20, in operation 2010, the image interpolation apparatus 900 of FIG. 9 transforms pixel values in a spatial domain by using a plurality of basis functions having different frequencies. The pixel values may be a plurality of pixel values included in a predetermined block or may be rows or columns of pixel values arranged in the horizontal or vertical direction.

Here, the transform may be 2D DCT or 1D DCT described above in relation to the transformer 910 and Equations (1), (2), (3), and (7).

In operation 2020, the image interpolation apparatus 900 shifts the phases of the plurality of basis functions used in operation 2010. The phases of the plurality of basis functions may be shifted according to a 2D interpolation location determined by '$\alpha_x$' and '$\alpha_y$' or according to a 1D interpolation location determined by '$\alpha$'.

In operation 2030, the image interpolation apparatus 900 inversely transforms DCT coefficients, which were obtained by transforming the pixel values in the spatial domain in operation 2010, by using the plurality of basis functions, the phases of which were shifted in operation 2020. That is, pixel values on interpolation locations are generated by inversely transforming the DCT coefficients obtained in operation 2010.

If the transform performed in operation 2010 is 2D DCT, then in operation 2030, the image interpolation apparatus 900 generates pixel values on 2D interpolation locations by performing 2D inverse DCT on the DCT coefficients by using a plurality of cosine functions, the phases of which are shifted.

If the transform performed in operation 2010 is 1D DCT performed in rows or columns of pixel values, then in operation 2030, the image interpolation apparatus 900 generates pixel values on 1D interpolation locations by performing 1D inverse DCT on the DCT coefficients by using a plurality of cosine functions, the phases of which are shifted.

The plurality of basis functions, the phases of which are shifted and inverse transform based thereon, have been described above in relation to the inverse transformer 920 and Equations (4), (5), (6), and (8).

Figure 21:
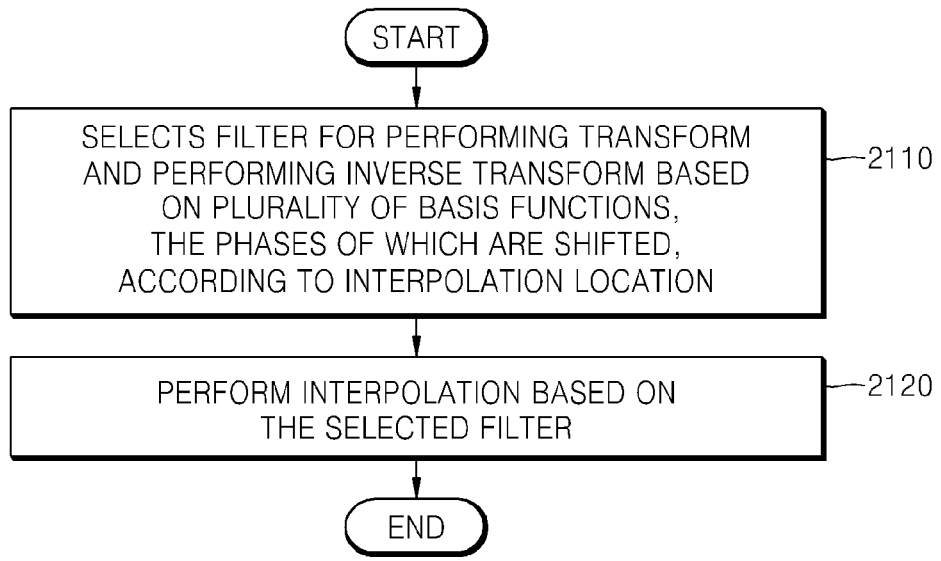
FIG. 21 is a flowchart illustrating an image interpolation method according to another exemplary embodiment.

FIG. 21 is a flowchart illustrating an image interpolation method according to another exemplary embodiment. Referring to FIG. 21, in operation 2110, the image interpolation apparatus 1400 of FIG. 14 selects a filter for performing transform and performing inverse transform based on a plurality of basis functions, the phases of which are shifted, according to an interpolation location. For example, a filter for performing DCT and performing inverse DCT based on a plurality of cosine functions, the phases of which are shifted, is selected according to an interpolation location. If pixel values that are to be interpolated are included in a predetermined block, then a filter for performing 2D DCT and 2D inverse DCT is selected based on '$\alpha_x$' and '$\alpha_y$'. If pixel values that are to be interpolated are rows or columns of pixel values, then a filter for performing 1D DCT and 1D inverse DCT is selected based on '$\alpha$'. One of the filters described above with reference to FIG. 15, FIGS. 16A to 16F, and FIG. 17 may be selected according to an interpolation location. However, the size of a filter may be determined by the various other factors apart from an interpolation location as described above in relation to the filter selector 1410 and with reference to FIG. 17.

In operation 2120, the image interpolation apparatus 1400 performs interpolation based on the filter selected in operation 2110. Pixel values on a 2D interpolation location or a pixel value on a 1D interpolation location may be generated by filtering pixel values in a spatial domain by using the filter selected in operation 2110. Interpolation performed using filtering has been described above in relation to Equations (9) to (19).

FIG. 22 is a flowchart illustrating an image interpolation method according to another exemplary embodiment. Referring to FIG. 22, in operation 2210, the image interpolation apparatus 1400 of FIG. 14 selects a different filter for interpolating between pixel values 1900 to 1906 of integer pixel units, according to an interpolation location. In the current exemplary embodiment, pixel values 1910, 1920, 1930, and 1940 of at least one fractional pixel unit may be generated directly from the pixel values 1900 to 1906 of the integer pixel values. Thus, the image interpolation apparatus 1400 selects interpolation filters corresponding to the interpolation locations, respectively, in operation 2210.

In operation 2220, the image interpolation apparatus 1400 generates the pixel values 1910, 1920, 1930, and 1940 of the at least one fractional pixel unit by interpolating between the pixel values 1900 to 1906 of the integer pixel units, based on the different filter selected according to each of interpolation locations in operation 2210.

In operation 2230, the image interpolation apparatus 1400 selects a different filter for interpolating between the pixel values 1910, 1920, 1930, and 1940 of the at least one fractional pixel unit generated in operation 2220, according to an interpolation location. A different filter for generating the pixel values 1950 of another fractional pixel unit illustrated in FIG. 19, which are present between the pixel values 1910, 1920, 1930, and 1940 of the at least one fractional pixel unit, is selected according to an interpolation location.

In operation 2240, the image interpolation apparatus 1400 generates the pixel values 1950 of another fractional pixel unit by interpolating the pixel values 1910, 1920, 1930, and 1940 of the at least one fractional pixel unit, based on the filter selected in operation 2230.

While exemplary embodiments have been particularly shown and described above, it will be understood by one of ordinary skill in the art that various changes in form and details may be made therein without departing from the spirit and scope of the inventive concept as defined by the following claims and their equivalents. Also, a system according to an exemplary embodiment can be embodied as computer readable code on a computer readable recording medium.

For example, each of an apparatus for encoding an image, an apparatus for decoding an image, an image encoder, and an image decoder according to exemplary embodiments as illustrated in FIGS. 1, 2, 4, 5, 9, and 14, may include a bus coupled to units thereof, at least one processor connected to the bus, and memory that is connected to the bus to store a command or a received or generated message and is coupled to the at least one processor to execute the command.

The computer readable recording medium may be any data storage device that can store data to be read by a computer system. Examples of the computer readable recording medium include read-only memory (ROM), random-access memory (RAM), compact disc (CD)-ROM, magnetic tapes, floppy disks, and optical data storage devices. The computer readable recording medium can also be distributed over network-coupled computer systems so that the computer readable code may be stored and executed in a distributed fashion.

What is claimed is:

1. A method of motion compensation, the method comprising:
    determining, in a luma reference picture, a luma reference block for prediction of a current block by using a luma motion vector;
    generating a luma sample of a 2/4-pixel location included in the luma reference block, by applying an 8-tap interpolation filter to luma samples of an integer pixel location of the luma reference picture; and
    generating a luma sample of a 1/4-pixel location or a 3/4-pixel location included in the luma reference block, by applying an interpolation filter to the luma samples of the integer pixel location of the luma reference picture without using the generated luma sample of the 2/4-pixel location,
    wherein the 8-tap interpolation filter comprises eight filter coefficients,
    the interpolation filter for generating the luma sample of the 1/4-pixel location or the 3/4-pixel location comprises a plurality of filter coefficients, and
    among the plurality of filter coefficients of the interpolation filter for generating the luma sample of the 1/4-pixel location or the 3/4-pixel location, at least two filter coefficients are different from each other.

2. The method of claim 1, wherein the generating of the luma sample of a 2/4-pixel location comprises scaling the luma sample generated by applying the 8-tap interpolation filter by using a luma scaling factor so that a sum of coefficients of the 8-tap interpolation filter is 1,
    wherein the luma scaling factor is 64.

3. The method of claim 1, wherein:
    an image is split into a plurality of maximum coding units,
    a maximum coding unit, among the plurality of maximum coding units, is hierarchically split into one or more coding units of depths including at least one of a current depth and a lower depth according to split information indicating whether a coding unit is split, when the split information indicates a split for the current depth, a coding unit of the current depth is split into four coding units of the lower depth, independently from neighboring coding units, and when the split information indicates a non-split for the current depth, prediction units are obtained from the coding unit of the current depth.

* * * * *